US009900142B2

United States Patent
Yi et al.

(10) Patent No.: US 9,900,142 B2
(45) Date of Patent: Feb. 20, 2018

(54) METHOD AND APPARATUS FOR FDD/TDD INTRA-NODE AND INTER-NODE CARRIER AGGREGATION

(71) Applicant: LG ELECTRONICS INC., Seoul (KR)

(72) Inventors: Yunjung Yi, Seoul (KR); Seungmin Lee, Seoul (KR); Joonkui Ahn, Seoul (KR); Dongyoun Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 14/895,159

(22) PCT Filed: Jun. 26, 2014

(86) PCT No.: PCT/KR2014/005721
§ 371 (c)(1),
(2) Date: Dec. 1, 2015

(87) PCT Pub. No.: WO2014/209049
PCT Pub. Date: Dec. 31, 2014

(65) Prior Publication Data
US 2016/0112178 A1 Apr. 21, 2016

Related U.S. Application Data

(60) Provisional application No. 61/839,836, filed on Jun. 26, 2013, provisional application No. 61/863,418,
(Continued)

(51) Int. Cl.
*H04L 5/00* (2006.01)
*H04W 16/32* (2009.01)
(Continued)

(52) U.S. Cl.
CPC ............ *H04L 5/0094* (2013.01); *H04L 5/001* (2013.01); *H04L 5/0007* (2013.01); *H04W 16/32* (2013.01);
(Continued)

(58) Field of Classification Search
CPC ............ H04W 72/1289; H04W 16/32; H04W 72/1247; H04W 76/025; H04W 84/045;
(Continued)

(56) References Cited

U.S. PATENT DOCUMENTS 9,497,747 B2 * 11/2016 Damnjanovic ......... H04L 5/001
2012/0106404 A1   5/2012 Damnjanovic
(Continued)

FOREIGN PATENT DOCUMENTS

JP        2013046418 A    3/2013

OTHER PUBLICATIONS

"3rd Generation Partnership Project;Technical Specification Group Radio Access Network; Evolved Universal Terrestrial Radio Access (E-UTRA);Carrier Aggregation; Base Station (BS) radio transmission and reception"; 3GPP TR 36.808 V10.0.0 (Jun. 2012).

*Primary Examiner* — Robert Lopata
(74) *Attorney, Agent, or Firm* — Dentons US LLP

(57) ABSTRACT

Methods and apparatuses for TDD/FDD aggregation are described. The Method thereto comprises receiving information on uplink scheduling, wherein the uplink scheduling is a scheduling on uplink transmission configured with a carrier aggregation of a primary cell (PCell) with TDD and a secondary cell (SCell) of FDD or a carrier aggregation of a PCell with FDD and a SCell with TDD and transmitting uplink signal based on the uplink scheduling.

14 Claims, 24 Drawing Sheets

Related U.S. Application Data filed on Aug. 7, 2013, provisional application No. 61/881,922, filed on Sep. 24, 2013, provisional application No. 61/952,888, filed on Mar. 14, 2014.

(51) Int. Cl.
   *H04W 72/12*  (2009.01)
   *H04W 76/02*  (2009.01)
   *H04W 84/04*  (2009.01)

(52) U.S. Cl.
   CPC ... *H04W 72/1247* (2013.01); *H04W 72/1289* (2013.01); *H04L 5/0062* (2013.01); *H04W 76/025* (2013.01); *H04W 84/045* (2013.01)

(58) Field of Classification Search
   CPC ..... H04L 5/0007; H04L 5/001; H04L 5/0062; H04L 5/0094; H04L 5/14
   USPC .......................................................... 370/280
   See application file for complete search history.

(56) References Cited

U.S. PATENT DOCUMENTS

| | | | |
|---|---|---|---|
| 2012/0257552 A1 | 10/2012 | Chen et al. | |
| 2012/0281600 A1 | 11/2012 | Tseng et al. | |
| 2013/0286907 A1* | 10/2013 | Wei | H04L 5/001 370/281 |
| 2013/0343239 A1* | 12/2013 | Damnjanovic | H04L 5/001 370/280 |
| 2014/0029484 A1* | 1/2014 | Choi | H04J 3/1694 370/280 |
| 2014/0086078 A1* | 3/2014 | Malladi | H04W 72/042 370/252 |
| 2014/0161002 A1* | 6/2014 | Gauvreau | H04W 16/24 370/280 |
| 2014/0211671 A1* | 7/2014 | Choi | H04J 3/1694 370/280 |
| 2014/0241220 A1* | 8/2014 | Choi | H04L 5/14 370/280 |
| 2014/0293893 A1* | 10/2014 | Papasakellariou | H04W 72/04 370/329 |
| 2015/0003302 A1* | 1/2015 | Ekpenyong | H04W 72/14 370/280 |
| 2015/0043394 A1* | 2/2015 | Lin | H04L 1/1861 370/280 |
| 2015/0304087 A1* | 10/2015 | He | H04W 72/12 370/280 |
| 2015/0359029 A1* | 12/2015 | Seo | H04L 1/18 370/329 |
| 2016/0182211 A1* | 6/2016 | Choi | H04W 72/1278 370/280 |

* cited by examiner

METHOD AND APPARATUS FOR FDD/TDD INTRA-NODE AND INTER-NODE CARRIER AGGREGATION

This application is a 35 USC § 371 National Stage entry of International Application No. PCT/KR2014/005721, filed on Jun. 26, 2014 and claims priority to U.S. Provisional Application Nos. 61/839,836, filed Jun. 26, 2013, 61/863,418, filed Aug. 7, 2013, 61/881,922, filed Sep. 24, 2013, and 61/952,888, filed Mar. 14, 2014 all of which are incorporated by reference in their entirety herein.

TECHNICAL FIELD

The present invention relates to wireless communications, and more particularly, to a method and apparatus for transmitting and receiving radio signal with frequency division duplex (FDD)/time division duplex (TDD) aggregation for both inter-node and intra-node resource aggregation scenarios.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established where one CG can have multiple CCs. Each CC is defined by a single bandwidth and a center frequency.

A system in which data is transmitted and/or received in a broadband through a plurality of CCs is referred to as a multi-component carrier system (multi-CC system) or a CA environment. A system in which data is transmitted and/or received in a broadband through a plurality of CGs is referred to as a inter-node resource aggregation or dual connectivity environment. The multi-component carrier system and dual connectivity system perform both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an enhanced Node B (eNB) and an user equipment (UE) as a Terminal. Also an efficient cell planning for multi-CCs is required. Also various signals or efficient cell planning schemes are required to transmit between the eNB and the UE to support inter-cell interference reduction and carrier extensions. Furthermore, inter-node resource allocation by tight coordination among eNBs for a UE is also feasible where multi-CC aggregation is achieved over multiple eNBs/nodes. An efficient operation scheme for the cell planning including a new carrier which is necessarily transmitted restricted or eliminated controls and RS signals, and further UE's operation in a small cell cluster environment needs to be defined. The efficient operation includes proper monitoring and synchronization timing for small cells and macro cell. When different duplex mode (FDD and TDD) carriers are aggregated, new issues are raised. One issue would be the capability of simultaneous reception and transmission at the UE either due to hardware capability (half-duplex UEs) or due to interference between FDD and TDD carriers.

SUMMARY OF INVENTION

Technical Problem

An object of the present invention is to provide a method and an apparatus for FDD/TDD aggregation, particularly for scenarios where simultaneous reception and transmission are not assumed.

Another object of the present invention is to provide a method and an apparatus for signaling effectively under FDD/TDD aggregation, particularly for scenarios where simultaneous reception and transmission are not assumed.

Another object of the present invention is to provide a method scheduling UL and DL with FDD/TDD aggregation, particularly for scenarios where simultaneous reception and transmission are not assumed.

Technical Solution

An embodiment of the present invention is a method for frequency division duplex (FDD)/time division duplex (TDD) aggregation by a base station (BS) comprising performing scheduling for uplink (UL) and/or downlink (DL) transmission, wherein the scheduling is performed based on the UL/DL configurations of a primary cell (PCell) of TDD and a secondary cell (SCell) of FDD or a PCell of FDD and a SCell of TDD, transmitting DL signal based on the scheduling for the DL transmission, and receiving UL signal based on the scheduling for the UL transmission.

Another embodiment of the present invention is an apparatus for transmitting and receiving a radio signal based on frequency division duplex (FDD)/time division duplex (TDD) aggregation comprising a radio frequency (RF) unit for transmitting and receiving a radio signal and a processor operatively coupled to the RF unit, wherein the processor is configured for perform scheduling for uplink (UL) and/or downlink (DL) transmission configured with a primary cell (PCell) of TDD and a secondary cell (SCell) of FDD or a PCell of FDD and a SCell of TDD.

Yet another embodiment of the present invention is a method for frequency division duplex (FDD)/time division duplex (TDD) aggregation by a user equipment (UE) comprising receiving downlink signal including a scheduling, wherein the scheduling is configured based on downlink (DL)/uplink (UL) transmission configured with a primary cell (PCell) with TDD and a secondary cell (SCell) of FDD or configured with a PCell with FDD and a SCell with TDD, and transmitting uplink signal based on the uplink scheduling.

Yet another embodiment of the present invention is an apparatus for transmitting and receiving a radio signal based on frequency division duplex (FDD)/time division duplex (TDD) aggregation comprising a radio frequency (RF) unit for transmitting and receiving a radio signal, and a processor operatively coupled to the RF unit, wherein the processor is configured for transmitting signals via the RF unit based on a scheduling for UL and/or DL, wherein the scheduling is configured based on downlink (DL)/uplink (UL) transmission configured with a primary cell (PCell) with TDD and a secondary cell (SCell) of FDD or configured with a PCell with FDD and a SCell with TDD.

Advantageous Effects

According to the present invention, FDD/TDD aggregation is performed with high efficiency.

According to the present invention, signaling can be effectively performed under FDD/TDD aggregation.

According to the present invention, scheduling UL and DL can be performed with FDD/TDD aggregation . . . .

MODE FOR INVENTION

Figure 1:
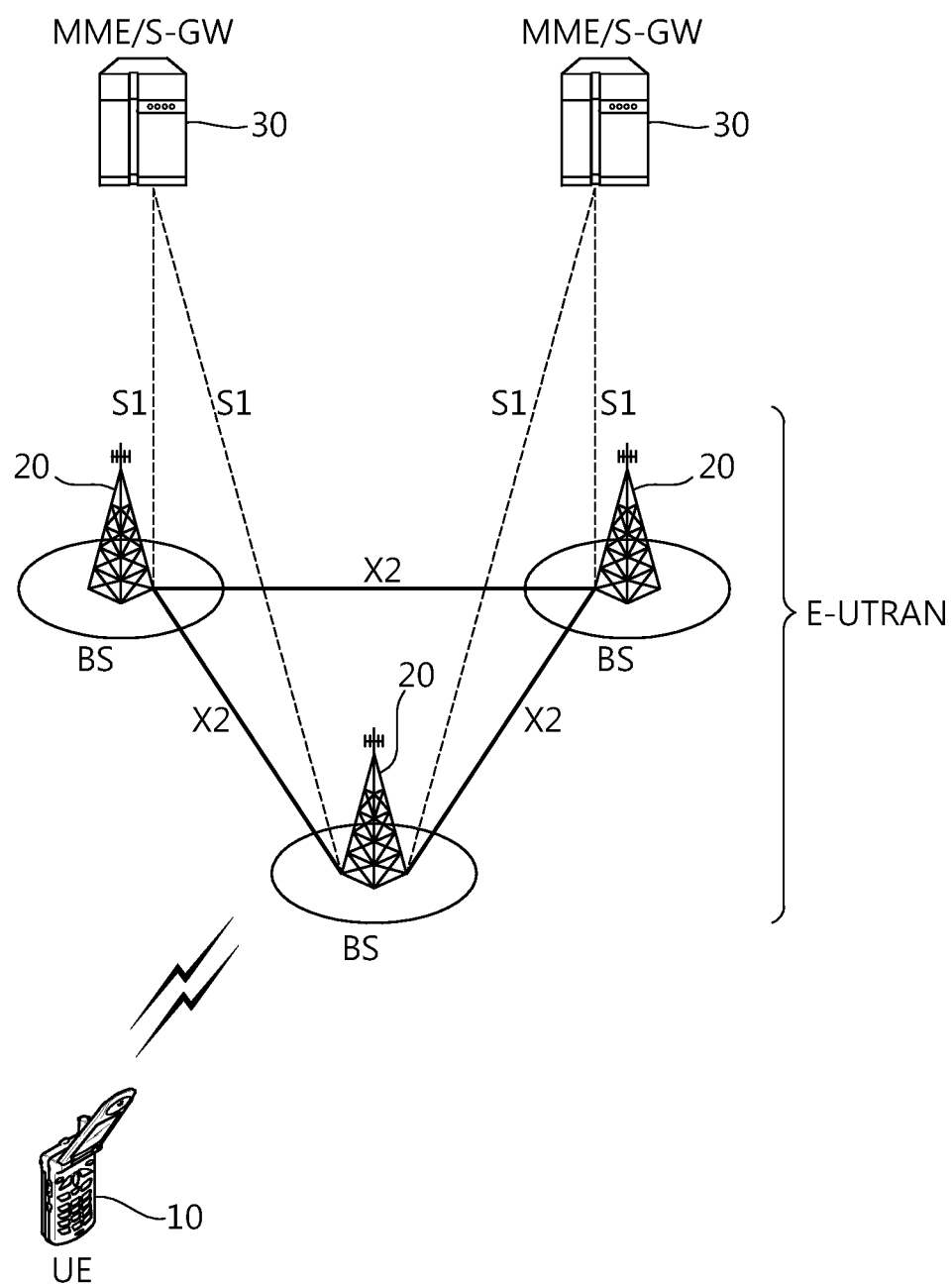
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

Figure 2:
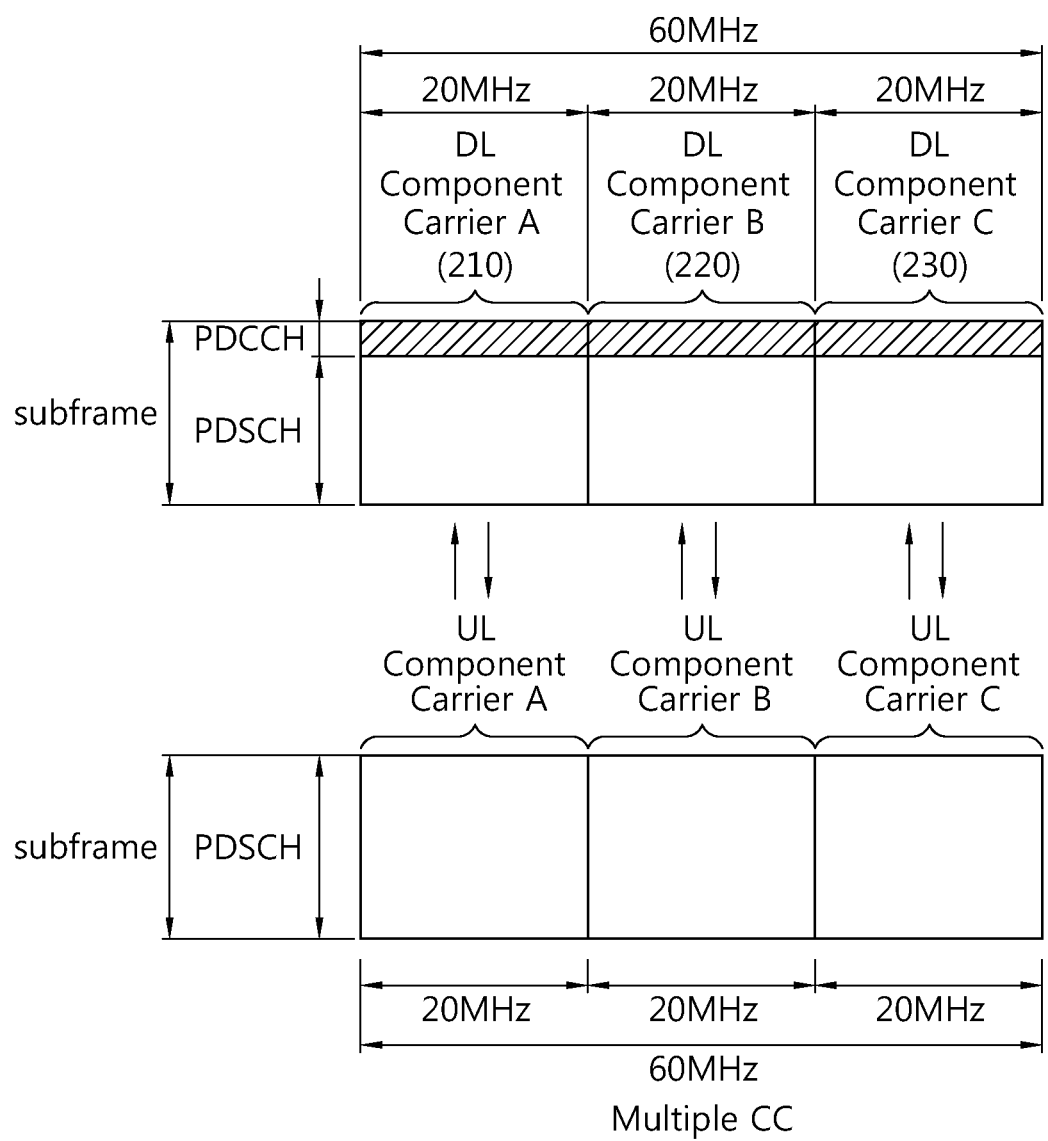
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 3:
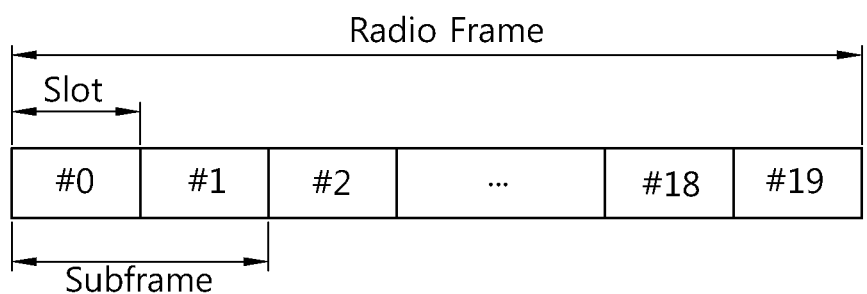
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system.

Figure 4:
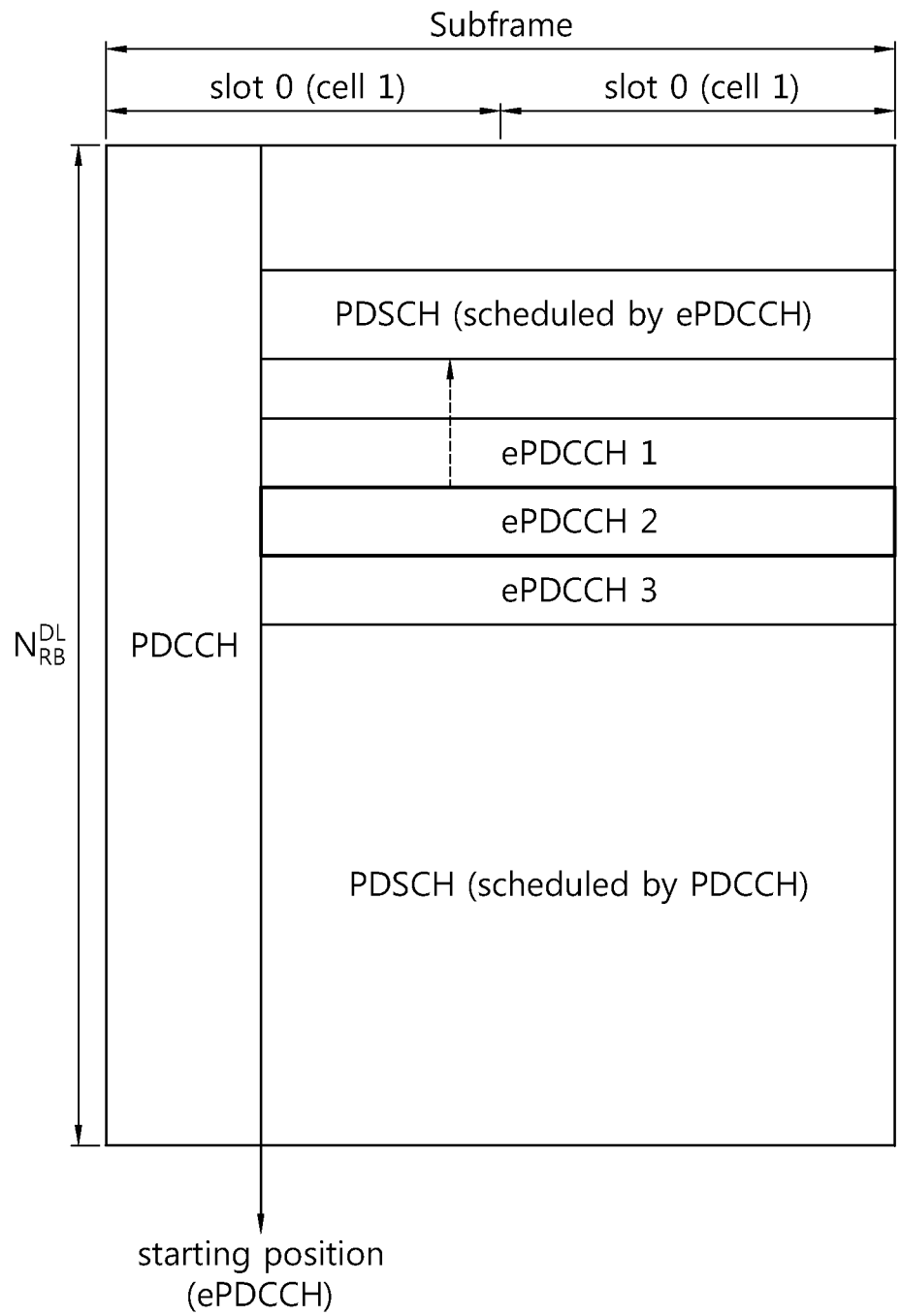
FIG. 4 shows downlink control channels to which the present invention is applied.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MB-SFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific common reference signal (CRS) may be omitted in some subframes or physical broadcast channel (PBCH) may not be transmitted.

Meanwhile, an operator may have more than a band. Thus BS(s) or cells and UE may operate with at least two bands.

Assuming the operator has two bands—at least one band for FDD and at least one band for TDD. A few possible cases to utilize the multiple bands are provided as below:

CASE 1: Carrier aggregations with (1) two downlinks in macro cells, and (2) one uplink in a macro cell and the other uplink in a remote radio head (RRH).

Figure 5A:
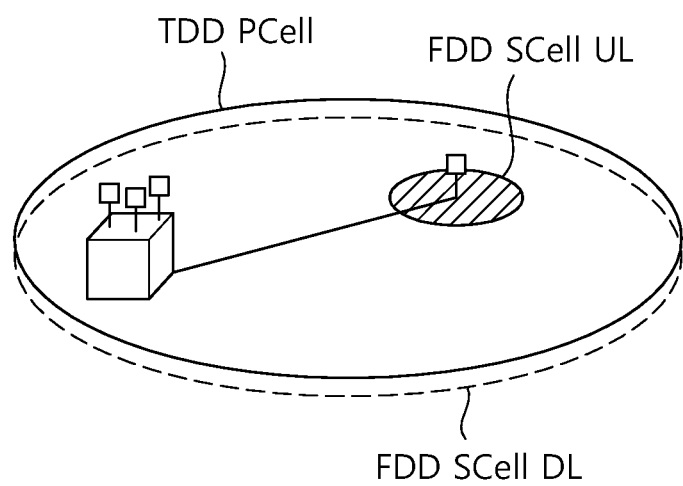
FIG. 5A and FIG. 5B describe briefly two examples of CASE 1.
Figure 5B:
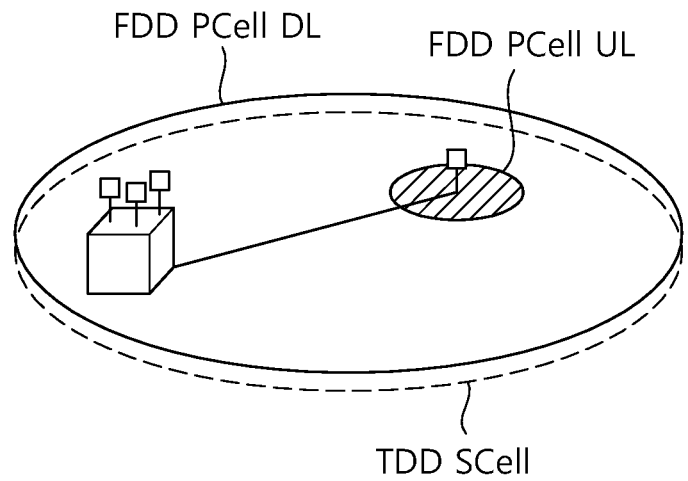

FIG. 5A and FIG. 5B describe briefly two examples of CASE 1.

CASE 2: (i) Simultaneous carries where each carrier has its own downlink and uplink (uplink may or may not be present), and (ii) eNBs run carriers may be connected via non-ideal backhaul.

Figure 6A:
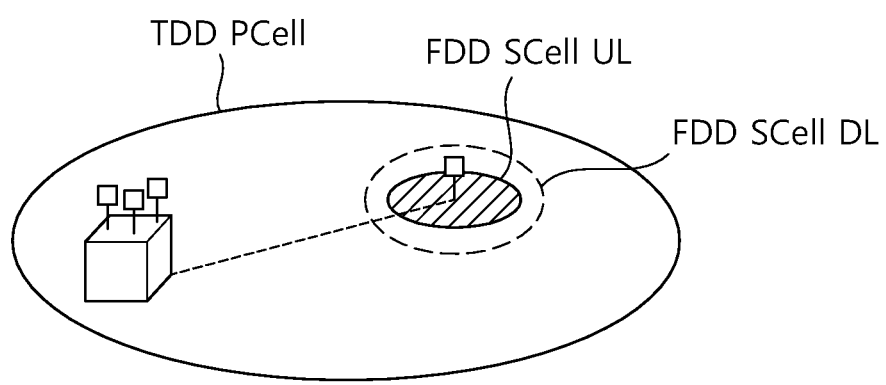
FIG. 6A and FIG. 6B describe briefly two examples of CASE 2.
Figure 6B:
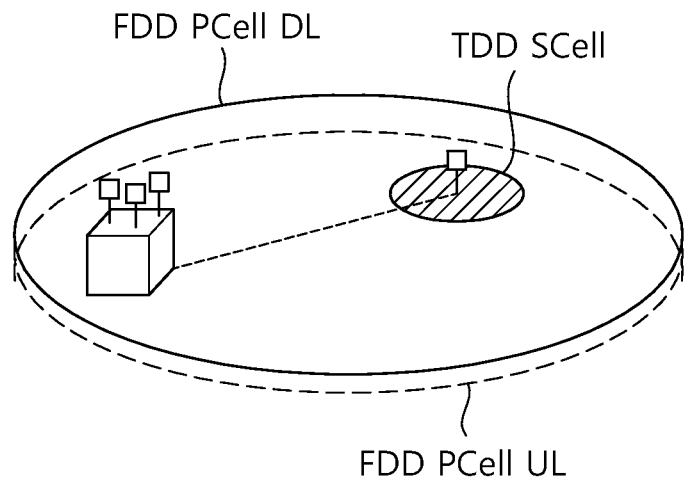

FIG. 6A and FIG. 6B describe briefly two examples of CASE 2.

Case 3: Over non-ideal backhaul, (a) two downlinks, and (b) one uplink carrier and one uplink carrier may be associated. In this case, inter-node resource aggregation would be achieved among multiple base stations.

Figure 7A:
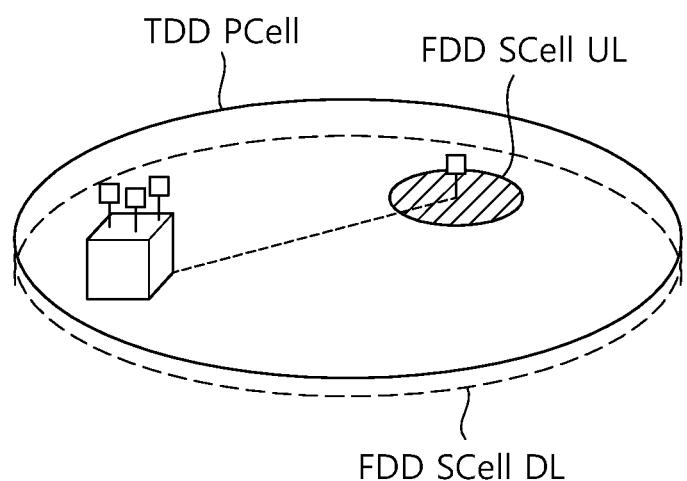
FIG. 7A and FIG. 7B describe briefly two examples of CASE 1.
Figure 7B:
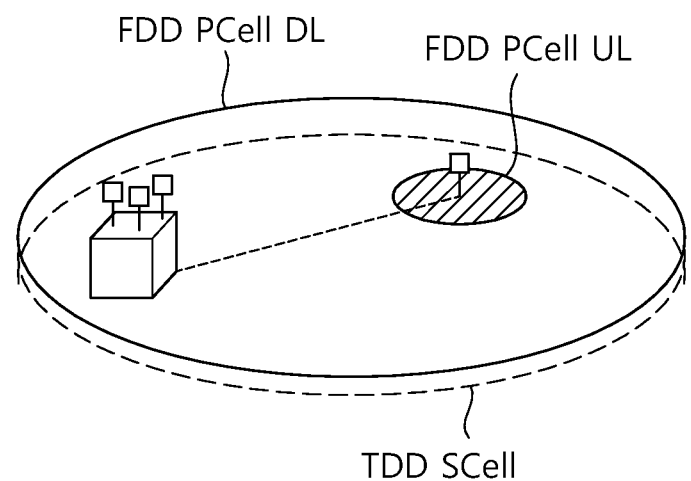

FIG. 7A and FIG. 7B describe briefly two examples of CASE 1.

Hereinafter, descriptions on the three cases (CASE 1, CASE 2 and CASE 3) of the present application as for an aggregation of TDD and FDD are explained in detail with FIGS.

However, the aggregation of TDD and FDD needs to be considered with frequency usage for TDD and FDD. That is, the aggregation of TDD and FDD needs to be configured under consideration of interference between bands and/or coexistence of bands.

FIGS. 8A to 8D briefly describe exemplary scenarios of frequency usage for TDD and FDD assumed in this application.

Figure 8A:
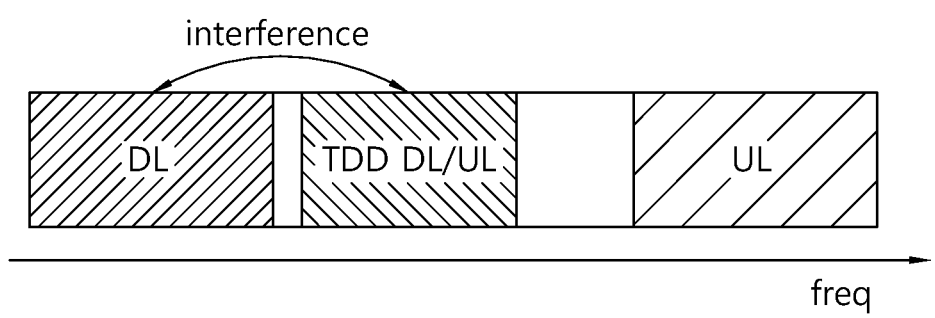
FIGS. 8A to 8D briefly describe exemplary scenarios of frequency usage for TDD and FDD assumed in this application.

FIG. 8A describes a case of interference occurring between FDD downlink CC and TDD CC. This case can be called as a scenario X.

Figure 8B:
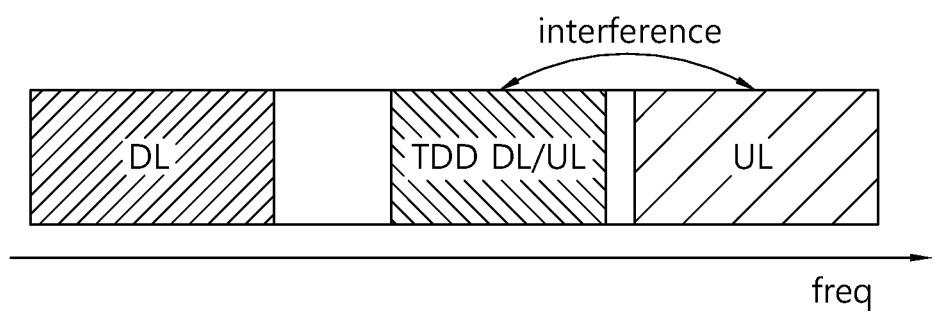

FIG. 8B describes a case of interference occurring between FDD uplink CC and TDD CC. This case can be called as a scenario Y.

Figure 8C:
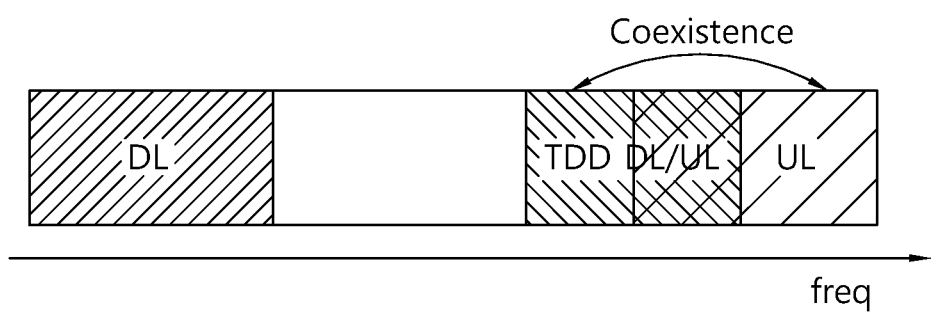

FIG. 8C describes a case that TDD CC and FDD downlink CC are (partially) coexisted. This can be called as a scenario Z.

Figure 8D:
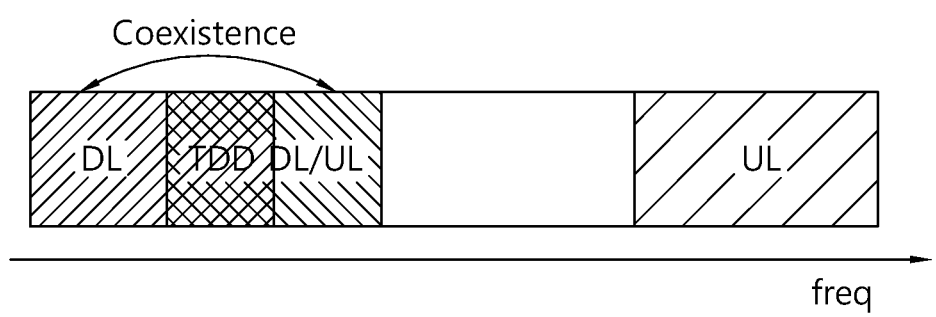

FIG. 8D describes a case that TDD CC and FDD downlink CC are (partially) coexisted. This can be called as a scenario Z.

Scenarios described in 8A to 8D can be handled by not allowing any data transmission in the overlapped or interference region if two carriers are supported by different operators as the coordination among operators can be challenging. However, if there is coordination mechanism placed, the techniques mentioned in this invention can be still applicable.

Assuming the same operator, instead of not utilizing overlapped or interference region totally, the operator may utilize different bands separately to handle the interference.

For example as shown in FIG. 6A, small cell may be used with TDD and then the interference between FDD uplink and TDD (i.e. Scenario Y) becomes rather local issue than cell-wide issue. The UEs belonging to both TDD small cell and FDD macro cell may have to be concerned about the interference from Scenario Y.

Thus, the interference/coexistence may be handled differently per UE depending on the interference/coexistence situation that each UE experiences.

However, for the case where TDD PCell is configured for a UE, FDD SCell may be configured with downlink only. When uplink CC information is not available for the configured SCell, UE may assume that downlink only FDD is aggregated.

In addition, the cases described in FIGS. 5A to 7B can be looked over in view of dual connectivity (DC). That is, referring to FIGS. 5A to 7B, FDD Scell UL in CASE 1A, FDD PCell UL in CASE 1B, FDD SCell in CASE 2A, TDD SCell in CASE 2B, FDD SCell UL in CASE 3A, and FDD PCell UL in CASE 3B may be functioned as a small cell in dual connectivity.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable.

Dual connectivity is an operation where a given UE consumes radio resources provided by at least two different network points (master eNB (MeNB) and secondary eNB (SeNB)) connected with non-ideal backhaul while in RRC_CONNECTED.

Figure 9:
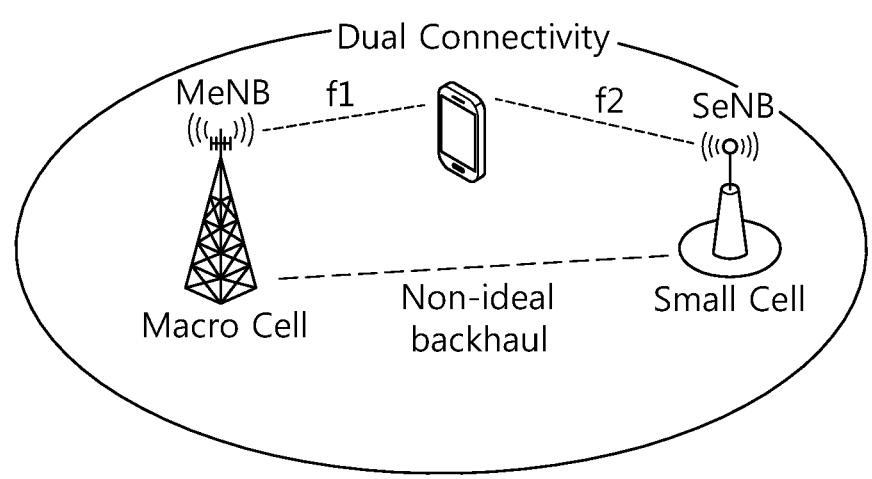
FIG. 9 shows an example of dual connectivity to a macro cell and a small cell.

FIG. 9 shows an example of dual connectivity to a macro cell and a small cell. Referring to FIG. 9, the UE is connected to both the macro cell and the small cell. A macro cell eNB serving the macro cell may be called as a MeNB in dual connectivity, and a small cell eNB serving the small cell may be called as a SeNB in dual connectivity.

The MeNB is an eNB which terminates at least S1-MME and therefore act as mobility anchor towards the core network (CN) in dual connectivity. If a macro eNB exists, the macro eNB may function as the MeNB, generally. The SeNB is an eNB providing additional radio resources for the UE, which is not the MeNB, in dual connectivity. The SeNB is responsible for transmitting best effort (BE) type traffic, while the MeNB is responsible for transmitting other types of traffic such as VoIP, streaming data, or signaling data. The interface between the MeNB and SeNB is called Xn interface. The Xn interface is assumed to be non-ideal, i.e., the delay in Xn interface could be up to 60 ms such as CASES 2 and 3 of this application described above.

Figure 10:
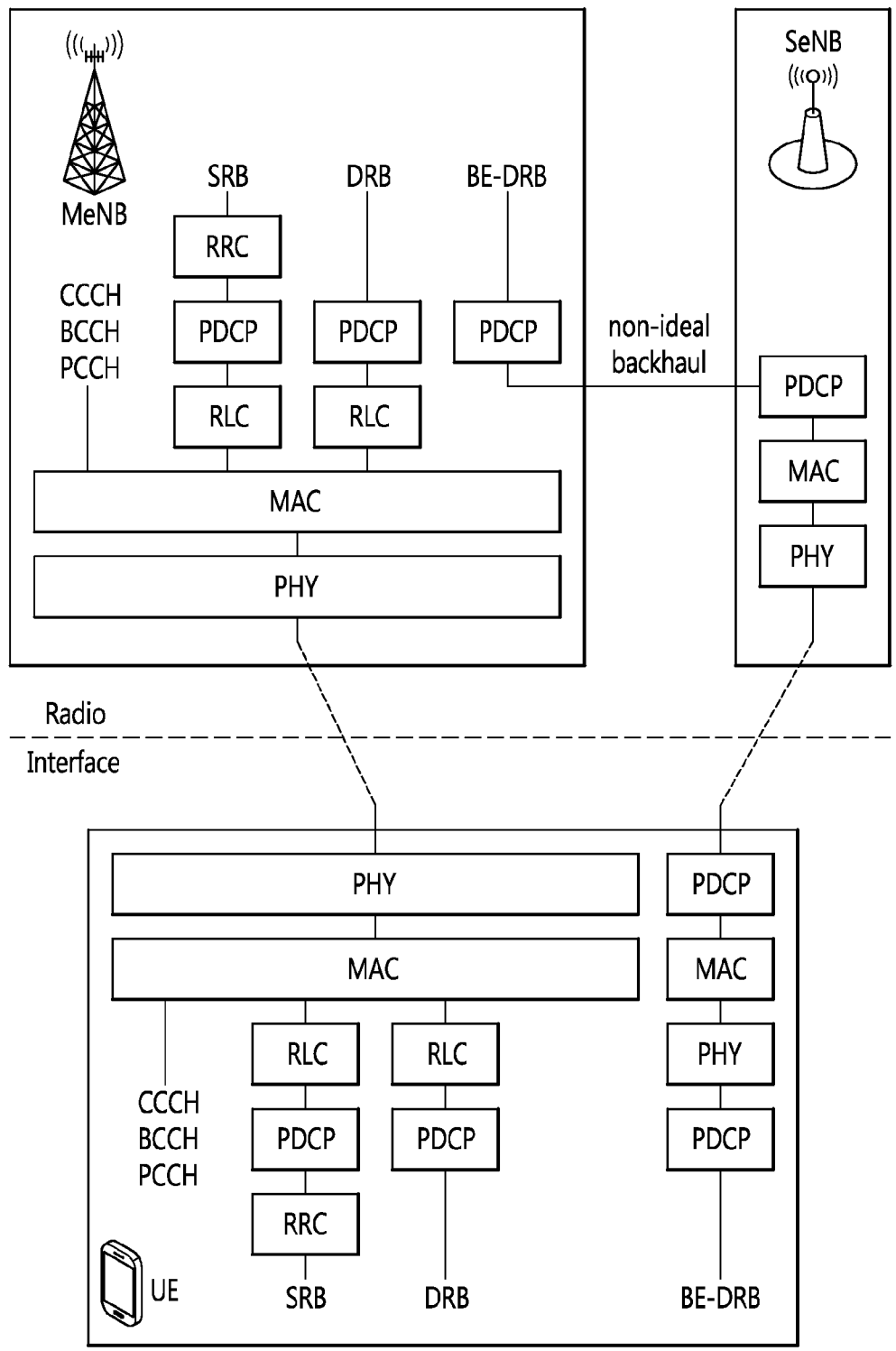
FIG. 10 shows an example of a protocol architecture supporting dual connectivity.

FIG. 10 shows an example of a protocol architecture supporting dual connectivity. To support dual connectivity, various protocol architectures have been studied. Referring to FIG. 10, PDCP and RLC entities are located in different network nodes, i.e., PDCP entities in the MeNB and RLC entities in the SeNB. In the UE side, the protocol architecture is same as the prior art except that the MAC entity is setup for each eNB (i.e., the MeNB and SeNB).

Now, with the four scenarios, the three cases of this application for TDD/FDD aggregation are as below. Basically, scheduling for FDD/TDD aggregation may be performed in views of securing a TDD downlink and a priority for PCell. In addition to the scheduling scheme, details for issues are explained below, which may be occurred according to the scheduling proposed.

CASE 1A: TDD PCell and FDD SCell DL in Macro and FDD SCell UL in

The CASE 1A is briefly described in FIG. 5A. It may be configured with TDD PCell in macro, FDD SCell DL in macro, and FDD SCell UL in RRH as shown in FIG. 5A. A RRH may be a BS with a radio frequency (RF) part without a base band part.

Downlink Scheduling as for CASE 1A

When self-scheduling is used, DCI format follows the CC where downlink data is scheduled and/or transmitted. For example, if TDD downlink subframe is scheduled with DCI, DCI format or scheduling follows TDD DCI format.

When cross-CC scheduling is used, DCI format follows the CC where downlink data is transmitted. For example, if TDD downlink subframe is scheduled with FDD cross-CC DCI, DCI format follows FDD DCI format.

Alternatively, DCI format may follow the CC duplex type where DCI is transmitted. Another alternative is to disable cross-CC scheduling when different duplex mode CCs are aggregated. Yet another alternative is to follow DCI format of TDD when FDD CC and TDD CC are aggregated. In this alternative, additional fields may be used only when TDD duplex mode is ignored for FDD CC DCI.

At a subframe when PCell has uplink subframe and SCell has downlink subframe, even if cross-CC scheduling is configured, a UE may expect self-scheduling DCI in SCell downlink subframe.

When different duplex mode CCs are aggregated, particularly for dual connectivity case, a UE is expected to read MIB and/or SIB from both CCs even though one CC is aggregated as for SCell and a UE was not expected to read common search space for SCell.

For different duplex mode CCs, UE may read common search space (CSS)/user equipment-specific search space (USS) from CCs which have different duplex mode from PCell. CSS is a space configured with 16 CCE of indices 0 to 15, in which PDCCH having common control information is searched. While USS may support PDCCH having CCE aggregation level of {1, 2, 4, 8}, CSS may support PDCCH having CCE aggregation level of {4, 8}.

For CSS, a UE shall not assume it can be cross-CC scheduled. In other words, regardless of cross-CC scheduling configuration, UE expect to read DCI in CSS from the scheduled CC.

(2) Uplink Scheduling as for CASE 1A

When cross-CC scheduling is used for uplink scheduling, whether to follow PCell timing for uplink transmission or follow scheduled CC for uplink transmission may be determined. It may be configured for a UE to follow either direction which can be a parameter configured by higher layer when cross-CC scheduled is configured with different duplex mode CCs aggregated.

When PCell timing is followed, UE may not utilize other uplink transmissions except for the uplink subframes of both PCell and SCell. Otherwise, UE may utilize all the uplink subframes. When self-scheduling is used, which timing for channel state information (CSI), and HARQ-ACK/NACK for SCell should be followed can be configured as well. A UE may be configured to follow PCell or scheduling cell.

(3) Physical HARQ Indicator Channel (PHICH) and HARQ ACK/NACK as for CASE 1A

In this CASE 1A, a UE may be configured with SCell UL as a main uplink for HARQ-ACK/NACK transmission as FDD UL has more available uplink subframes. In this case, when SCell is activated with configuring SCell UL as a primary uplink CC, after k subframe (e.g., k=8 or 35), it starts transmission of HARQ-ACK/NACK via SCell UL. When SCell is deactivated, it falls-back to PCell.

(4) SPS Handling as for CASE 1A

SPS uplink transmission would be occurred in the SCell UL as well when SCell uplink is configured as primary uplink.

(5) Scenarios as for CASE 1A

Some further considerations for different scenarios where frequency for each CC is selected as shown are described as follows.

(i) Scenario X: Interference Between TDD UL and FDD DL—Adjacent Freq

Scenario X is briefly described in FIG. 8A. Since TDD is configured as PCell in CASE 1A, TDD UL shall be protected. To protect TDD UL, SCell FDD downlink power may be reduced when PCell is in uplink similar to reduced almost blank subframe (ABS) where PDSCH will be transmitted with lower power. An ABS is a subframe that may be transmitted without data which may not be transmitted.

The reduced power shall be indicated to the UE so that proper decoding with accordingly configured transmission power is performed.

Or, FDD downlink may not be used. Similar to ABS subframe, FDD downlink may transmit RS and other essential signals only.

Alternatively, FDD DL may be protected. In this case, TDD UL may be disabled or used only if FDD DL is not used. A UE may restrict the usage of TDD UL based on higher-layer signal indicating a subset of UL subframes which can be used for uplink transmissions or PUCCH transmission. If TDD UL is disabled, PUCCH transmission may be detoured to SCell FDD UL.

(ii) Scenario Y: Interference Between TDD DL and FDD UL—Adjacent Freq

Scenario Y is briefly described in FIG. 8B. Since TDD is configured as PCell in CASE 1A, TDD DL shall be protected. To protect TDD DL, FDD UL may be used with lower power similar to flexible subframe defined for dynamic TDD UL/DL configuration.

Separate power control for those subframes with lower uplink transmission power may be configured. More specifically, in those subframes, only PUSCH is transmitted without piggybacking CSI and/or HARQ-ACK/NACK.

Alternatively, only FDD UL subframes which are aligned with TDD UL subframes may be used for any uplink transmission or PUCCH transmission. In this case, a UE may receive higher-layer signaling with a reference TDD DL/UL configuration which the UE shall follow to determine PUCCH and/or PUSCH timing. Or, a UE may receive higher-layer signaling with a subset of uplink subframes that UE can transmit any uplink signals or PUCCH signals.

For a downlink subframe which may not have the associated HARQ-ACK/NACK uplink if SCell FDD follows PCell HARQ-ACK/NACK timing, a few mechanisms can be considered.

First approach is not to transmit any USS data (or masked with C-RNTI or SPS-RNTI) on those subframes as HARQ-ACK cannot be produced. Second approach is to transmit PDSCH where UE shall assume ACK or NACK would not be produced for the PDSCH transmitted in that subframe. Thirdly, a new timing can be defined. One easy mechanism for timing is to determine the timing as n+10 where n is the downlink subframe. Details are described in Scenario Y of CASE 2A.

The same thing applies to CSI feedback and other feedback such as SRS.

(iii) Scenario Z: Coexistence Between TDD and FDD UL

Scenario Z is briefly described in FIG. 8C. Since TDD is configured as PCell in CASE 1A, TDD DL/UL shall be protected.

In this Scenario Z, more specifically, a UE may be configured with both TDD and FDD CCs where SCell may not be activated. In this case, for UEs in coverage of both TDD and FDD (i.e., in the coverage of RRH), only uplink subframes common for both TDD and FDD UL may be used for uplink and other uplink in FDD UL may be disabled even if FDD SCell is activated.

To mitigate potential interference from other UEs uplink transmission on downlink reception of the UE, the network may configure ABS for uplink subframes for SCell which will be used for downlink transmission for the UEs in the coverage of both cells. Techniques proposed for Scenario Y can also be applicable to Scenario Z.

(iv) Scenario W: Coexistence Between TDD and FDD DL

Scenario W is briefly described in FIG. 8D. However, scenario Z may not occur in CASE 1A.

(6) UE with Single Uplink Capability as for CASE 1A

If a UE is able to transmit only one uplink at once, PCell and SCell uplink may be TDM-ed or either PCell or SCell uplink is selected to be used exclusively.

Moreover, when TDM fashion is used for uplink sharing, PCell and SCell uplink configuration may be given as one of TDD UL/DL configurations (e.g., TDD UL/DL configurations 2 for PCell or TDD UL/DL configurations 1 for Scell) where uplink PUSCH and HARQ-ACK/NACK timing can follow the configured UL/DL configuration as a reference. Table 1 is described TDD UL/DL configurations.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

When PCell and SCell both have uplink at a subframe, a UE may transmit to the PCell uplink at the given uplink subframe. Otherwise, a UE may transmit to each configured CC for the uplink transmission. For example, PCell UL/DL configuration is configuration 0, then the uplink subframes possible for PCell is $2^{nd}$ and $7^{th}$ subframes in a radio frame with reference configuration of 2. When uplink conflicts at $2^{nd}$ subframe and $7^{th}$ subframe between PCell and SCell, the UE may transmit to PCell in those unless configured otherwise.

For uplink scheduling DCI shall follow the reference configuration timing. When a CC is configured as uplink CC exclusively, it can be changed semi-statically via higher-layer signalling.

CASE 1B: FDD PCell DL and TDD SCell in Macro and FDD PCell UL in RRH

The CASE 1B is briefly described in FIG. 5B. It may be configured with FDD PCell DL in macro, FDD PCell DL in RRH, and TDD SCell as shown in FIG. 5B.

Downlink Scheduling for CASE 1B

When self-scheduling is used, DCI format follows the CC where downlink data is scheduled/transmitted. For example, if TDD downlink subframe schedules DCI, DCI format follows TDD DCI format.

When cross-CC scheduling is used, DCI format follows the CC where downlink data is transmitted. For example, if TDD downlink subframe schedules FDD cross-CC DCI, DCI format follows FDD DCI format.

Alternatively, DCI format may follow the CC duplex type where DCI is transmitted. Another alternative is to disable cross-CC scheduling when different duplex mode CCs are aggregated. Another alternative is to follow DCI format of TDD when FDD and TDD CC are aggregated where additional fields used only for TDD duplex mode will be ignored for FDD CC DCI.

When different duplex mode CCs are aggregated, a UE is expected to read MIB and/or SIB from both CCs even though one CC is aggregated as for SCell and a UE was not expected to read CSS for SCell. For different duplex mode CCs, UE may read CSS/USS from CCs which have different duplex mode from PCell.

For CSS, a UE shall not assume it can be cross-CC scheduled. In other words, regardless of cross-CC scheduling configuration, the UE may expect to read CSS DCI from the scheduled CC.

(2) Uplink Scheduling for CASE 1B

Uplink scheduling in CASE 1B is same as CASE 1A.

One exception is that, when self-scheduling is used, PUSCH timing may be configured to follow PCell (i.e., uplink transmission occurs $n+4^{th}$ subframe assuming uplink scheduling is transmitted at nth subframe). For example, PUSCH may be transmitted via PCell uplink as long as there is only one uplink grant in $n^{th}$ subframe from all downlink CCs when uplink is not available in SCell with self-scheduling.

In other words, eNB may use SCell DL to transmit uplink grant for PCell where resource allocation and others are fitted for PCell uplink.

(3) PHICH and HARQ ACK/NACK for CASE 1B

PHICH for CASE 1B is same as CASE 1A. As for HARQ ACK/NACK, if PCell is FDD, CSI and HARQ-timing may follow PCell. Or, a UE can be configured to follow either PCell or scheduled cell.

(4) Scenarios for CASE 1B

Some further considerations for different scenarios where frequency for each CC is selected as shown FIGS. 8A to 8D are described as follows.

(i) Scenario X: Interference Between TDD UL and FDD DL—Adjacent Freq

Scenario X is briefly described in FIG. 8A. Since FDD is configured as PCell in CASE 1B, FDD DL shall be protected. To protect FDD DL, SCell TDD UL may be used with lower power similar to flexible subframe defined for dynamic TDD UL/DL configuration.

Separate power control for those subframes with lower uplink transmission power may be configured. More specifically, in those subframes, only PUSCH is transmitted without piggybacking CSI and/or HARQ-ACK.

(ii) Scenario Y: Interference Between TDD and FDD UL—Adjacent Freq

Scenario Y is briefly described in FIG. 8B. Since FDD is configured as PCell in CASE 1B, FDD UL shall be protected. To protect FDD UL, TDD may be used with lower power for downlink and uplink transmission. Or, it is up to eNB scheduling to avoid potential conflict, where different power control may not be essential.

Alternatively, only FDD UL subframes which are aligned with TDD UL subframes may be used for any uplink transmission or PUCCH transmission. In this case, a UE may receive a higher-layer signaling with a reference TDD DL/UL configuration which the UE shall follow to determine PUCCH and/or PUSCH timing. Or, a UE may receive a higher-layer signaling with a subset of uplink subframes that the UE can transmit any uplink signals or PUCCH signals.

Alternatively, when a UE has been configured with FDD and TDD carrier aggregation, and the UE has been indicated to "PCell UL follow SCell UL timing" via higher-layer signaling or MAC CE. Once SCell activation is performed, the uplink timing of PCell follows SCell uplink timing, and the necessary timing adjustment will follow.

The detail mechanism is same as described in scenario Y of CASE 2B.

(iii) Scenario Z: Coexistence Between TDD and FDD UL

Scenario Z is briefly described in FIG. 8C. Since FDD is configured as PCell in CASE 1B, FDD UL shall be protected.

For conflict of uplinks in PCell and SCell, eNB scheduling can be used to avoid potential collision. For conflict between PCell uplink and SCell downlink, it may be avoided by scheduling or eNB hardware.

More specifically, UL power for PCell could be much lower than that of SCell as PCell uplink is targeted for RRH whereas SCell uplink is targeted for macro cell. Thus, configuring ABS for uplink subframes among TDD UL and FDD UL could be needed such that TDD UL and FDD UL may not occur simultaneously from the multiple UEs.

(iv) Scenario W: Coexistence Between TDD and FDD DL

Scenario W is briefly described in FIG. 8D. Since FDD is configured as PCell in CASE 1B, FDD DL may be protected over TDD.

In case collision between FDD DL and TDD DL, it may be addressed by eNB scheduling. In case of collision between FDD DL and TDD UL, it may be addressed by eNB scheduling and TDM-ed configuration among FDD DL subframe and TDD UL subframe. Or, reduced power for conflicting uplink subframe may be used.

(5) UE with Single Uplink Capability for CASE 1B

A UE with single uplink capability in CASE 1B is same as CASE 1A.

CASE 2A: TDD PCell in Macro and FDD SCell DL/UL in Small Cell Connected Via Non-Ideal Backhaul The CASE 2A is briefly described in FIG. 6A. It may be configured with TDD PCell as a macro cell, FDD SCell DL and FDD Scell UL as small cells, and non-ideal backhaul as shown in FIG. 6A.

This case may be handled by combination of CASE 1A and CASE 1B and inter-site carrier aggregation.

Some further considerations for different scenarios shown in FIGS. 8A to 8D are as followings:

(i) Scenario X: Interference Between TDD UL and FDD DL—Adjacent Freq

Scenario X is briefly described in FIG. 8A. Scenario X for CASE 2A is same as CASE 1A.

However, PCell and SCell are coordinated via non-ideal backhaul. Thus, coordination on signaling exchanges via X2 interface or other interface would be necessary. In terms of timing and techniques, the techniques used for CASE 1A can be applicable to this case as well.

(ii) Scenario Y: Interference Between TDD DL and FDD UL—Adjacent Freq

Scenario Y is briefly described in FIG. 8B. Since TDD is configured as PCell in CASE 2A, TDD DL shall be protected. To protect TDD DL, FDD UL may be used with lower power similar to flexible subframe defined for dynamic TDD UL/DL configuration. Separate power control for those subframes with lower uplink transmission power may be configured. More specifically, in those subframes, only PUSCH is transmitted without piggybacking CSI and/or HARQ-ACK/NACK.

Alternatively, only FDD UL subframes which are aligned with TDD UL subframes may be used for any uplink transmission or PUCCH transmission. In this case, a UE may receive higher-layer signaling with a reference TDD DL/UL configuration which the UE shall follow to determine PUCCH and/or PUSCH timing for FDD UL (SCell). Or, a UE may receive higher-layer signaling indicating a subset of uplink subframes that UE can transmit any uplink signals or PUCCH signals.

Since PCell and SCell are over non-ideal backhaul and inter-site, either a UE or PCell eNB informs SCell eNB of the restricted UL subframes. If a UE is configured by higher-layer to restrict the uplink for SCell by a reference TDD DL/UL configuration, the configuration is given to the SCell by PCell or UE.

This exchange can be occurred at SCell configuration or activation. SCell informs either a UE or PCell the acknowledgement. Or, when a UE is configured with SCell, it may be indicated whether to follow PCell UL timing and restrict UL subframes of SCell as well aligned with PCell UL.

One indication may be "SCell UL follows PCell UL." If this indication is triggered, UE shall assume that the usable uplink of FDD UL would be aligned with PCell UL subframes, and all the uplink timings are determined following PCell UL timing.

Alternatively, even in inter-site CA, a UE may assume that once SCell is configured, SCell UL shall follow PCell UL timing unless it is configured otherwise. For inter-site carrier aggregation, regardless of whether TDD is PCell or FDD is PCell (in other words, CASE 2A or CASE 2B, techniques to handle Scenario X and Y can be applicable to both cases as independent uplink transmissions per each network point is expected). More detail solutions applicable in this case is described in scenario Y of CASE 2B. Yet alternatively, if FDD UL is protected, TDD DL may be transmitted with lower power or ABS which may be signaled to UE by higher layer. Note that the techniques mentioned for Scenario Y of CASE 2A or CASE 2B can be applied to other cases as well if applicable.

(iii) Scenario Z: Coexistence Between TDD and FDD UL

Scenario Z is briefly described in FIG. 8C. Scenario Z in CASE 2A is same as scenario Z of CASE 1A with additional backhaul signaling for the coordination.

In this case, similar to scenario Y, a restricted UL for SCell FDD UL may be configured such that only SCell uplink subframes which are aligned with uplink subframes according to PCell TDD UL/DL configuration can be used for uplink transmission for either PCell or SCell.

Even though uplink frequency is overlapped, if inter-site carrier aggregation is used (i.e., the receiving eNBs are inter-site), concurrent uplink transmissions to different network points can be feasible.

Thus, concurrent uplink transmissions similar to scenario Y can be feasible. Note that the techniques mentioned for scenario Z with CASE 2A can be applied to other cases as well if applicable.

(iv) Scenario W: Coexistence Between TDD and FDD DL

Scenario W is briefly described in FIG. 8D. For inter-site carrier aggregation case, if a UE can handle two simultaneous downlinks on the overlapped frequency, this case may not be an issue for CASE 2A.

CASE 2B: FDD PCell in Macro and TDD SCell DL/UL in Small Cell Connected Via Non-Ideal Backhaul The CASE 2B is briefly described in FIG. 6B. It may be configured with FDD PCell DL and FDD PCell UL as macro cells and TDD Scell as a small cell, and non-ideal backhaul as shown in FIG. 6B.

This case may be handled by combination of CASE 1B and inter-site carrier aggregation.

Some further considerations for different scenarios shown in FIGS. 8A to 8D are as followings:

(i) Scenario X: Interference Between TDD UL and FDD DL—Adjacent Freq

Scenario X is briefly described in FIG. 8A. Since FDD is configured as PCell in CASE 2B, FDD DL shall be protected. To protect FDD DL, SCell TDD UL may be used with lower power similar to flexible subframe defined for dynamic TDD UL/DL configuration.

Separate power control for those subframes with lower uplink transmission power may be configured. More specifically, in those subframes, only PUSCH is transmitted without piggybacking CSI and/or HARQ-ACK/NACK. With ideal-backhaul carrier aggregation, SCell uplink transmission can be disabled and all uplink transmissions can be performed via PCell UL.

However, if inter-site carrier aggregation is used, at least partial uplink subframes of SCell should be usable. Thus, in this case, SCell uplink should be protected. The protection mechanism for Scenario X with CASE 2A may be applied in this case as well.

To be more specific, no DL transmission on subframes of PCell DL, which are aligned with TDD UL subframes, can be assumed. When a UE is configured with TDD UL with indication "PCell DL timing follows SCell DL," a UE shall assume that once the TDD SCell is activated, only DL subframes aligned with SCell DL subframes according to SCell TDD DL/UL configuration would be used for PCell downlink transmissions.

Those subframes can be assumed as ABS subframes. In other words, the UE may expect to receive CRS and PDCCH CSS and PDSCH scheduled by CSS in those subframes. DL subframes aligned between PCell and SCell, the UE assume any USS PDSCH will be scheduled. Uplink grant can be scheduled in any subframe. PHICH can be assumed to be present in those ABS subframes.

In summary, UE may assume no USS PDSCH only in those subframes not aligned with SCell DL subframes. Alternatively, all downlink signaling may be disabled in those not aligned subframes except for CRS similar to ABS.

Another alternative is to treat those subframes same as to ABS. The techniques mentioned here is applicable to scenario X in other cases as well if applicable.

(ii) Scenario Y: Interference Between TDD and FDD UL—Adjacent Freq

Scenario Y is briefly described in FIG. 8B. Since FDD is configured as PCell in CASE 2B, FDD UL shall be protected. To protect FDD UL, TDD may be used with lower power for downlink and uplink transmission. Or it is up to eNB scheduling to avoid potential conflict, where different power control may not be essential.

Alternatively, only FDD UL subframes which are aligned with TDD UL subframes may be used for any uplink transmission or PUCCH transmission. In this case, a UE may receive higher-layer signaling with a reference TDD DL/UL configuration which the UE shall follow to determine PUCCH and/or PUSCH timing. Or a UE may receive higher-layer signaling with a subset of uplink subframes that UE can transmit any uplink signals or PUCCH signals.

Alternatively, when a UE has been configured with FDD and TDD carrier aggregation, and the UE has been indicated to "PCell UL timing follow SCell UL" via higher-layer signaling or MAC CE, once SCell activation is performed, the uplink timing of PCell follows SCell uplink timing. When this indication is signaled, a UE may follow SCell uplink timing only for PUCCH or any uplink signal. If this technique is used, an example of HARQ-ACK/NACK timing and association for PCell can be illustrated in FIG. 11.

Figure 11:
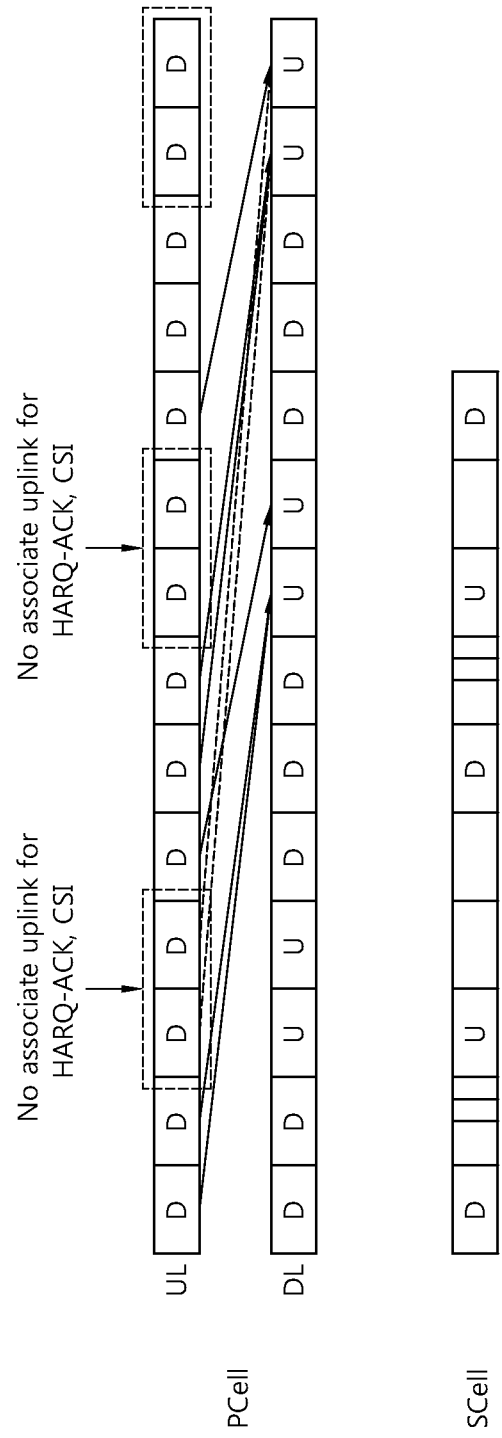
FIG. 11 briefly describes an example of PUCCH according to scenario Y of CASE 2B.

FIG. 11 briefly describes an example of PUCCH according to scenario Y of CASE 2B. Referring to FIG. 11, PCell UL timing changes per SCell.

Specifically, as shown in the FIG. 11, uplink subframes aligned with SCell UL/DL configuration may be used for uplink transmissions and the HARQ-ACK/NACK and CSI timing (etc) are changed according for PCell uplink to follow TDD DL/UL configuration.

In this case, there would be a few downlink subframes which do not have the associated uplink subframes according to TDD DL timing mapping tables.

A simple solution to this is to map each downlink subframe n to n+10 uplink subframe. Thus, in addition to TDD mapping table, each uplink of PCell shall carry HARQ-ACK/NACK or CSI requested or referenced from the previous radio frame (i.e., n−$10^{th}$ subframe) as illustrated in dotted lines in the FIG. 11.

Note that a constant value such as 10 or 20 can be used to determine the timing in this case. Or, another option is to allow downlink transmission which would not require HARQ-ACK/NACK feedback. A UE shall not transmit HARQ-ACK/NACK for PDSCHs transmitted in those subframes.

In other words, even though UE fails decoding of data in those subframes, it shall not transmit NACK. When a UE is configured with SCell with "PCell UL timing follow SCell UL=TRUE," it shall assume either timing is predetermined if HARQ-ACK/NACK signal/CSI is expected for those subframes or no HARQ-ACK/NACK for those subframe DL data transmissions.

A UE may be higher-layer configured with option to handle downlink transmissions in those subframes not mapped to the restricted uplink subframes.

Alternatively, UE may assume that any downlink data transmission would not occur in those subframes including CSS and/or USS (or USS only or C-RNTI/SPS-RNTI masked only). Further details are described in scenario Y of CASE 1A.

(iii) Scenario Z: Coexistence Between TDD and FDD UL

Scenario Z is briefly described in FIG. 8C. Since FDD is configured as PCell in CASE 2B, FDD UL shall be protected. For conflict of uplinks in PCell and SCell, eNB scheduling can be used to avoid potential collision.

For conflict between PCell uplink and SCell downlink, it may be avoided by scheduling or eNB hardware. The techniques mentioned for scenario Y with CASE 2B are applicable to this case as well.

(iv) Scenario W: Coexistence Between TDD and FDD DL

Scenario W is briefly described in FIG. 8D. Techniques for scenario X with CASE 2B are applicable to this case as well.

CASE 3A: TDD PCell and FDD SCell DL in Macro and FDD SCell UL in Small Cell where Macro and Small Cell are Connected Via Non-Ideal Backhaul The CASE 3A is briefly described in FIG. 7A. It may be configured with TDD PCell as a macro cell, FDD SCell DL as a macro cell and FDD Scell UL as a small cell with non-ideal backhaul as shown in FIG. 7A.

As for the CASE 3A, it is needed in general to address uplink and downlink split.

Figure 12:
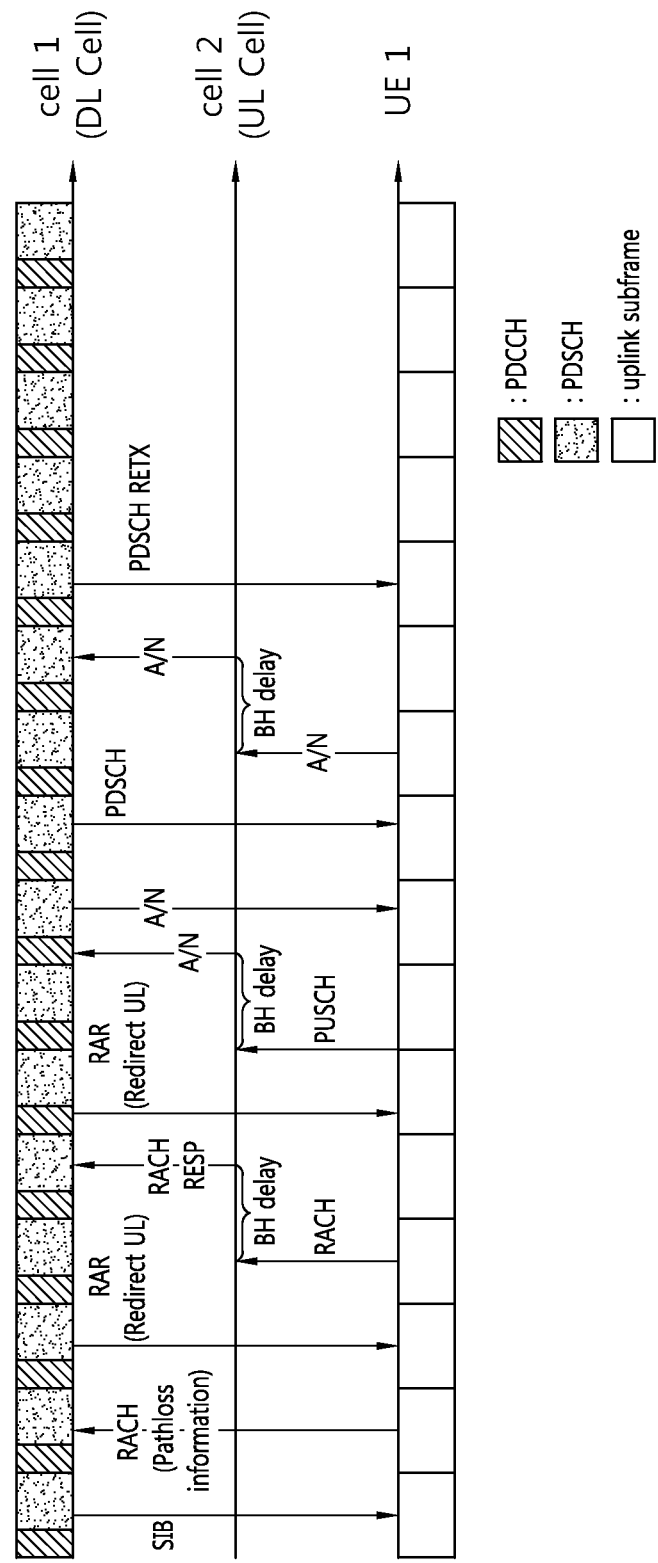
FIG. 12 briefly describes an example of DL/UL split for the CASE 3A.

FIG. 12 briefly describes an example of DL/UL split for the CASE 3A.

Referring FIG. 12, an example of separate DL and UL carrier is shown with non-ideal backhaul assumption. The non-ideal backhaul may cause backhaul delay (BH delay) as shown.

Usage of Separate Carriers

In terms of configuring a separate UL carrier from DL carrier, a few mechanisms are possible.

(1) System Information to Include Separate DL and UL Carriers.

MIB or SIB may carry one DL carrier information with two or more UL carriers such that a UE may be able to select different UL carrier which is reachable by the UE (based on discovery and RRM measurement).

For example, SIB may carry DL frequency, cell ID for DL carrier, SIB-linked UL carrier and a set of {UL-split carrier center frequency, UL-split carrier SIB-linked DL carrier cell ID, etc}.

A similar thing can be applied to one UL carrier with multiple DL carriers. If this approach is used, a UE may assume that SIB-linked UL carrier is chosen by default and other UL carriers can be chosen based on RRM measurement. For example, a UE may use path-loss information (if available) to choose an UL carrier. When this is used, additional fields shall be used so that legacy UEs are not affected.

(b) Via RACH Procedure

Another approach is to use RACH response as shown in FIG. 12. A PRACH may carry additional information (either by payload or by selecting a specific preamble and/or resource) to indicate whether it is far from the DL carrier or not. If it is far from DL carrier (and thus implies that UL coverage is not guaranteed), a different UL carrier is informed via RAR.

The determination of an UL carrier may be negotiated among cells before responding RAR. In addition, eNB may use reported RRM results from the UE. OR some proximity signaling may be used.

(c) Via Higher Layer Signaling

Another approach to reconfigure UL carrier is to use higher layer signaling which will be in effect upon receiving ACK from the UE (via three-way handshaking) along with confirmation from the eNB.

2) Handling Backhaul Latency

When a separate carrier is used for DL and UL respectively, one simple way is to allow all downlink via DL carrier and all uplink via UL carrier. This approach however needs to address potentially large non-ideal backhaul latency between DL and UL carriers.

One approach to address this issue is to increase the number of HARQ processes (for example, if backhaul latency is 50 msec, add 50 more HARQ processes) so that concurrent transmissions can be achieved.

Another approach is to use air interface to reduce the backhaul latency which requires some protocol changes.

Another possible approach is to pair ACK/NACK with data path. In other words, ACK/NACK signal will be transmitted to the same eNB where data is transmitted.

For uplink transmission, ACK/NACK may be transmitted by the eNB which has received the uplink transmission. In other words, each DL carrier/UL carrier needs SIB-linked (or paired) ACK/NACK UL and PHICH DL carrier. If this approach is used, message flow is shown in FIG. 13.

Figure 13:
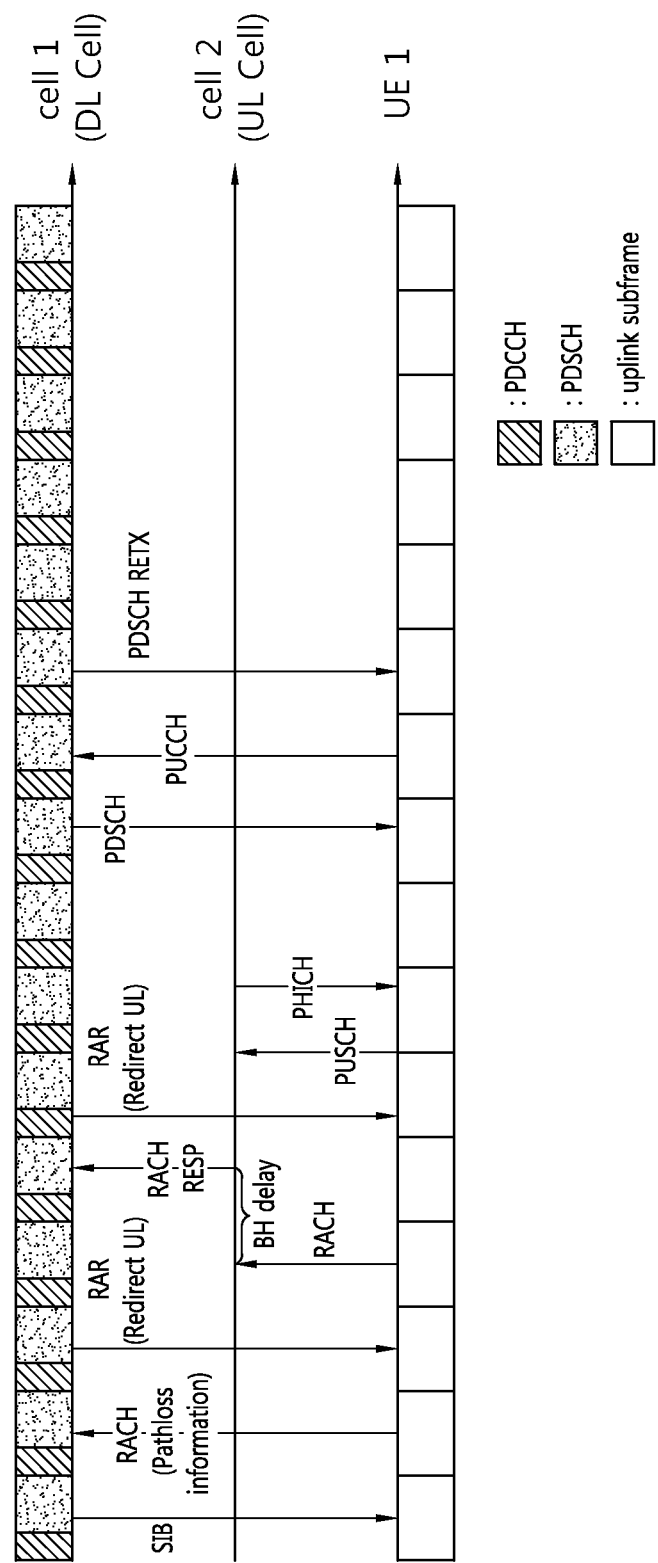
FIG. 13 briefly describes another example of UL/DL split for the CASE 3A.

FIG. 13 briefly describes another example of UL/DL split for the CASE 3A. Comparing the example of FIG. 12, there is no additional ACK/NACK latency in the example of FIG. 13.

In addition, scheduling schemes and issues thereto in CASE 3A are as below:

Downlink Scheduling for CASE 3A

When self-scheduling is used, DCI format follows the CC where downlink data is scheduled/transmitted. For example, if TDD downlink subframe schedules DCI, DCI format follows TDD DCI format. When cross-CC scheduling is used, DCI format follows the CC where downlink data is transmitted. For example, if TDD downlink subframe schedules FDD cross-CC DCI, DCI format follows FDD DCI format.

Alternatively, DCI format may follow the CC duplex type where DCI is transmitted. Yet another alternative is to disable cross-CC scheduling when different duplex mode CCs are aggregated over non-ideal backhaul. Yet another alternative is to follow DCI format of TDD when FDD and TDD CC are aggregated where additional fields used only for TDD duplex mode will be ignored for FDD CC DCI.

At a subframe when PCell has uplink subframe and SCell has downlink subframe, even if cross-CC scheduling is configured, a UE may expect self-scheduling DCI in SCell downlink subframe.

When different duplex mode CCs are aggregated over non-ideal backhaul, a UE is expected to read MIB and/or SIB from both CCs. For different duplex mode CCs over non-ideal backhaul, UE may read CSS/USS from CCs which have different duplex mode from PCell or CCs are not co-site with PCell. For CSS, a UE shall not assume it can be cross-CC scheduled. In other words, regardless of cross-CC scheduling configuration, UE expect to read CSS DCI from the scheduled CC where DCI format follows the CC duplex mode.

(2) Uplink Scheduling

When cross-CC scheduling is used for uplink scheduling, whether to follow PCell timing for uplink transmission or scheduled CC for uplink transmission shall be determined.

It is possible to allow configurability for a UE to follow either direction which can be a parameter when cross-CC scheduled is configured with different duplex mode CCs aggregated. More particular, in this scenario, it is desirable to utilize PUSCH in SCell FDD UL whereas PUCCH is transmitted in PCell TDD UL. If this occurs, piggybacking CSI and/or HARQ-ACK on PUSCH would be disabled. When PCell timing is followed, UE may not utilize other uplink transmissions except for the uplink subframes of both PCell and SCell. Otherwise, UE may utilize all the uplink subframes. When self-scheduling is used, which timing for CSI, and HARQ-ACK for SCell should be followed can be configured as well. A UE can be configured to follow PCell or scheduling cell.

(3) PHICH for CASE 3A

Since downlink CC and uplink CC is communicated over non-ideal backhaul, unless the latency of non-ideal backhaul is very small such as 2-3 ms, it is expected that PHICH may not be delivered following the currently defined PHICH timing.

To address this issue, a UE may be configured with "delayed PHICH" for the SCell UL transmissions where delay PHICH latency may be defined as legacy PHICH latency+"offset" where "offset" is for non-ideal backhaul delay.

A UE shall expect to receive PHICH at n+offset$^{th}$ subframe where n$^{th}$ subframe is the subframe where PHICH is expected following legacy protocol as shown in FIG. 11.

Alternatively, UE may be configured with "PHICH-less" operation for SCell UL operation. When delayed PHICH is used, retransmission timing is adjusted as well.

Alternatively, SCell eNB may have a very narrow downlink carrier which will not be associated as for legacy downlink, rather it will be associated as "control channel" which will be used for transmitting control channels and EPHICH (similar to DCI format 3/3A). If this is applied, uplink scheduling DCI may be transmitted in this "control" carrier as well as.

(4) HARQ-ACK/NACK for CASE 3A

In this case, as both downlinks are from macro eNB, it is desirable to transmit HARQ-ACK via UL carrier in macro eNB as well (which is PCell TDD UL) even though it may have limited uplink resources for ACK/NACK to minimize the latency of A/N. Moreover, disabling piggybacking of HARQ-ACK/NACK on PUSCH, particular, PUSCH transmitted over SCell UL, may be needed.

If backhaul delay is not significant, it is also considerable to configure SCell UL as primary uplink cell to transmit HARQ-ACK/NACK signal, other UCI and SPS PUSCH.

(6) SPS Handling

SPS uplink transmission would be occurred in the SCell UL as well when SCell uplink is configured as primary uplink in this case.

(7) Scenarios for CASE 1B

Further considerations for different scenarios where frequency for each CC is selected as shown in FIGS. 8A to 8B are as follows.

(i) Scenario X: Interference Between TDD UL and FDD DL—Adjacent Freq

Scenario X is briefly described in FIG. 8A. Since TDD is configured as PCell in CASE 3A, TDD UL shall be protected. To protect TDD UL, SCell FDD downlink power may be reduced when PCell is in uplink similar to reduced ABS where PDSCH will be transmitted with lower power.

The reduced power may be indicated to the UE so that proper decoding with accordingly configured transmission power is performed. Or FDD downlink may not be used.

Similar to ABS subframe, FDD downlink may transmit RS and other essential signals only.

(ii) Scenario Y: Interference Between TDD DL and FDD UL—Adjacent Freq

Scenario Y is briefly described in FIG. 8B. Since TDD is configured as PCell in CASE 3A, TDD DL shall be protected. To protect TDD DL, FDD UL may be used with lower power similar to flexible subframe defined for dynamic TDD UL/DL configuration. Separate power control for those subframes with lower uplink transmission power may be configured. More specifically, in those subframes, only PUSCH is transmitted without piggybacking CSI and/or HARQ-ACK.

(iii) Scenario Z: Coexistence Between TDD and FDD UL

Scenario Z is briefly described in FIG. 8C. Since TDD is configured as PCell in CASE 3A, TDD DL/UL shall be protected.

In this case, more specifically, a UE may be configured with both TDD and FDD CCs where SCell may not be activated.

Further, in this case, for UEs in coverage of both TDD and FDD (i.e., in the coverage of a small cell), only uplink subframes common for both TDD and FDD UL may be used for uplink and other uplink in FDD UL may be disabled even if FDD SCell is activated.

To mitigate potential interference from other UEs uplink transmission on downlink reception of the UE, the network may configure ABS subframe for uplink subframes for SCell which will be used for downlink transmission for the UEs in the coverage of both cells.

(iv) Scenario W: Coexistence Between TDD and FDD DL

Scenario W is briefly described in FIG. 8D. However, this case may not occur in CASE 3A.

(8) UE with Single Uplink Capability for CASE

If a UE is able to transmit only one uplink at once, PCell and SCell uplink may be TDM-ed or either PCell or SCell uplink is selected to be used exclusively.

Moreover, PCell and SCell uplink (when TDM fashion is used for uplink sharing) configuration can be given as one of TDD UL/DL configurations (e.g., configuration 2 for PCell and configuration 1 for Scell) where uplink PUSCH and HARQ-ACK/NACK timing can follow the configured UL/DL configuration as a reference.

When PCell and SCell both have uplink at a subframe, a UE may transmit to the PCell uplink at the given uplink subframe. Otherwise, a UE may transmit to each configured CC for the uplink transmission. For example, if PCell UL/DL configuration is configuration 0, then the uplink subframes possible for PCell is 2$^{nd}$ and 7$^{th}$ subframes in a radio frame with reference configuration of 2. When uplink conflicts at 2$^{nd}$ subframe and 7$^{th}$ subframe between PCell and SCell, UE may transmit to PCell in those unless configured otherwise. For uplink scheduling DCI shall follow the reference configuration timing.

When a CC is configured as uplink CC exclusively, it can be changed semi-statically via higher-layer signaling.

CASE 3B: FDD PCell DL and TDD SCell in Macro and FDD PCellUL in Small Cell where Macro and Small Cell are Connected Via Non-Ideal Backhaul The CASE 3B is briefly described in FIG. 7B. It may be configured with FDD PCell DL as macro cell, FDD PCell UL as a small cell and TDD Scell as a macro cell with non-ideal backhaul as shown in FIG. 7B.

The CASE 3B is a similar case to generic uplink/downlink split of FDD carrier. When a UE is capable of single TX only, it is desirable to disable TDD uplink so that PCell uplink can be fully utilized.

Alternatively, for HARQ-ACK transmission, TDD SCell UL can be utilized by switching primary uplink to SCell UL. If this is configured, a UE shall follow SCell UL/DL configuration (or a reference UL/DL configuration) for HARQ-ACK timing.

To reduce the latency, PRACH may be transmitted on SCell UL if configured. The timing of uplink change may be aligned with SCell activation/deactivation if configured where primary uplink will be changed to SCell UL when SCell is activated (fallback to PCell when SCell is deactivated).

Upon now, the exemplary cases of TDD/FDD aggregation according to the present invention are described in detail. However, it is noted that the techniques described in this application may be applied to aggregation of FDD and TDD in macro cell and RRH and/or macro and small cell over non-ideal backhaul as well, where each carrier has downlink and uplink pair and reside in the same eNB.

Further, the techniques proposed in this application may be applied to aggregation of same duplex mode as well (e.g., FDD/FDD and TDD/TDD). For TDD/TDD aggregation, change of primary uplink may be determined based on the number of available uplink subframes of each carrier based on SIB-ed UL/DL configurations (or dynamically changed UL/DL configurations).

Meanwhile, in addition to the cases of FDD/TDD aggregation, it may be needed to control transmission power in FDD/TDD aggregation and to determine aggregation timing.

Besides these, while the cases of carrier aggregation with two carriers are described above, it is also needed to consider carrier aggregation with three carriers.

Here, descriptions on transmission power control, carrier aggregation with three carriers and carrier aggregation timing determination in FDD/TDD aggregation are provided in order as above.

Uplink Transmission Power Control at Special Subframe

Figure 14:
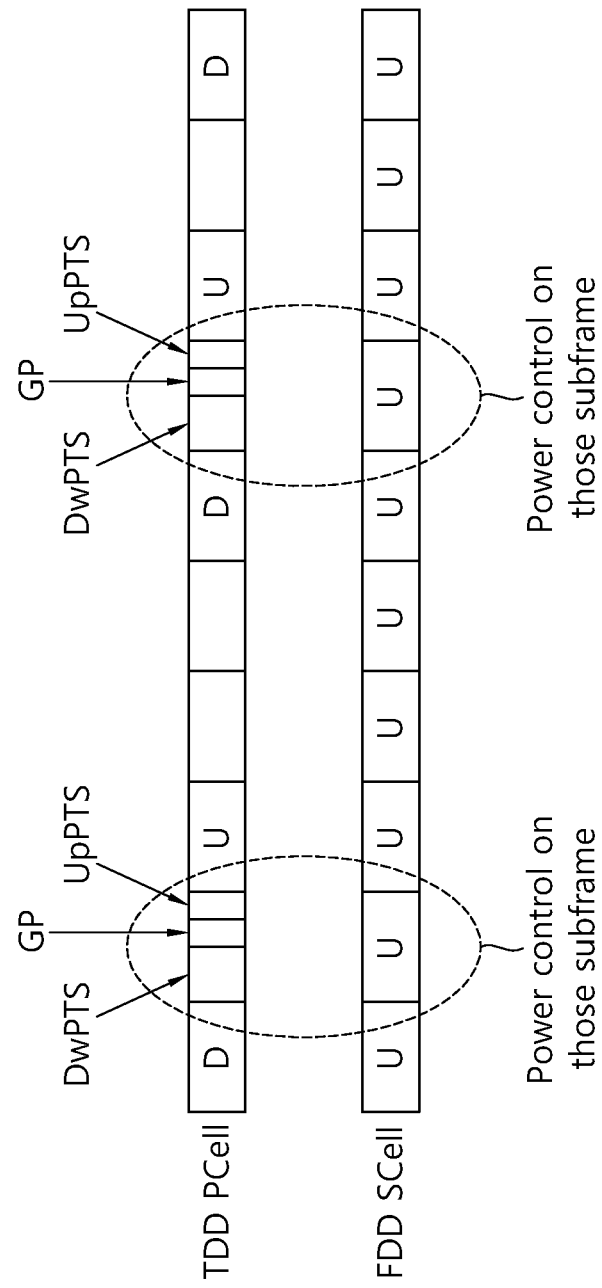
FIG. 14 briefly describes an example of subframes on which power control is performed according to the present invention.

FIG. 14 briefly describes an example of subframes on which power control is performed according to the present invention. Here, subframes of TDD PCell may follow one of TDD configurations.

As shown in FIG. 14, power control may be performed on the special subframe with downlink pilot time slot (DwPST), guard period (GP) and uplink pilot time slot (UpPTS).

Figure 15:
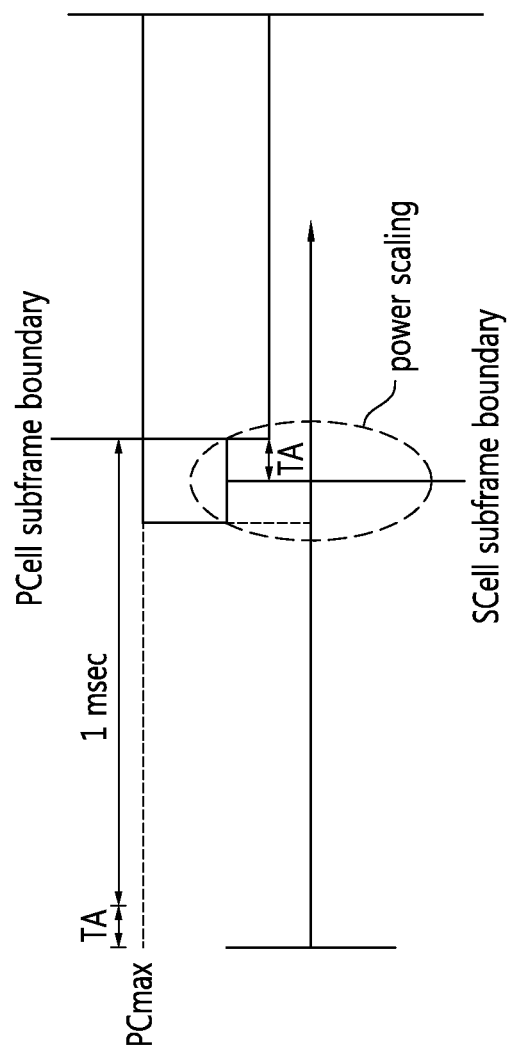
FIG. 15 briefly describes an example of power scaling according to the present invention.

FIG. 15 briefly describes an example of power scaling according to the present invention. In example of FIG. 15, subframes are configured according to the configuration of FIG. 14. Referring to FIG. 14, the regions on which the power scaling is performed in FIG. 15 is special subframes in the FIG. 14.

Referring to FIG. 14 and FIG. 15, uplink transmission power control at special subframe is described as below:

First, assuming a UE is capable of transmitting more than one uplink simultaneously, the power control at subframes where one CC has special subframe and the other CC(s) have normal uplink subframe may be properly adjusted.

(1) PUCCH Transmission at FDD SCell

If TDD PCell transmits SRS or PRACH while SCell transmit PUCCH, power scaling (if uplink power exceeds the maximum power) may not be occurred. Or, shortened PUCCH may be used (assuming two OFDM symbol shortened PUCCH is also available for PRACH+PUCCH transmission).

(2) PUSCH Transmission at FDD SCell

If TDD PCell transmits SRS or PRACH while SCell transmit PUCCH, power scaling (if uplink power exceeds the maximum power) on the last two OFDM symbol may be used for PUSCH transmission if shortened PUSCH is not used. Or, one or two (depending on how many uplink symbols used for PCell uplink transmission) may be punctured for PUSCH transmission. Or, if PCell and SCell UL are connected via non-ideal backhaul, a UE may assume that always (regardless of PCell UL transmission at UpPTS) last one or two OFDM symbols (depending on special subframe configuration of PCell) will be punctured for the uplink transmissions.

It may be further constrained to the case where the total uplink power exceeds the maximum power, UE assumes one or two last OFDM symbols (depending on special subframe configuration of PCell) will not be used for uplink transmission for SCell.

(3) SRS Transmission at FDD SCell

If PCell and SCell are connected via non-ideal backhaul, UE may not transmit SRS for SCell in those subframes where special subframe and normal uplink subframe collide if SRS is configured for PCell in those subframes.

(4) PRACH Transmission at FDD SCell

If PCell and SCell are connected via non-ideal backhaul, UE may not transmit PRACH for SCell in those subframes where special subframe and normal uplink subframe collide if PRACH is scheduled for PCell in those subframes.

Referring to FIG. 15 again, when timing advance (TA) is used such that UpPTS OFDM symbol overlap with more than one SCell uplink subframe, second uplink subframe may be power scaled throughput the entire subframe except for the subframes where special subframe and normal uplink collide at the last one or two OFDM symbols.

Power scaling (if the total power exceeds the maximum during 1 msec duration), it may scale down the last few OFDM symbols.

If FDD is PCell whereas TDD is SCell, SRS/PRACH configured in SCell UpPTS may not be transmitted if total power exceeds maximum power. If FDD and TDD are aggregated over non-ideal backhaul, regardless of maximum power, UpPTS may be disabled. In other words, special subframe of SCell may be treated as "shortened" downlink subframe.

Other rules in terms of power scaling or dropping uplink channels to handle maximum power follow the rules determined for handling multiple timing advance groups over ideal and non-ideal backhaul.

When FDD and TDD are aggregated over non-ideal backhaul, power scaling on SRS and/or PUCCH may be disabled where other channels would be scaled-down regardless of PCell or SCell or SRS and/or PRACH may be omitted in subframes where potential case may be expected (e.g., subframe+normal uplink subframe). Other subframes power control may be handled by "pre-allocating" scale for each CC (e.g., 60%/40% scaling to PCell/SCell where power scaling would occur 60% and 40% ratio for PCell and SCell transmission) or avoidance of simultaneous transmission by TDM or pre-configured maximum power per CC (e.g., 1/2 PCmax for PCell and 1/2 PCmax for SCell) such that maximum power of each CC is limited and thus total power may not exceed the total PCmax. Alternatively, a UE may be disabled with simultaneous transmission to eNBs which are connected via non-ideal backhaul to avoid potential ambiguity and so on.

In this case, PCell may configure a bitmap of uplink subframes for each eNB (for TDM) or assign only one uplink CC (exclusive).

FDD/TDD Coexistence when More than 3CCs are Aggregated

If FDD is PCell and FDD uplink subframes are restricted due to interference such as in scenario Y of FIG. 8B and additional two TDD carriers are aggregated, the timing of TDD carrier would be determined as follows:

(1) Assuming FDD carrier CC1, TDD carrier CC2 and the last TDD carrier CC3, let's say the adjacent TDD carrier to FDD UL would be CC3 and TDD DL/UL configuration of CC3 is M ($0 \leq M \leq 6$).

Then, the reference uplink timing of FDD may be the same as TDD DL/UL configuration M or other reference configuration Q ($0 \leq Q \leq 6$, Q#M). Let's assume FDD PCell changes its timing to follow configuration Q.

(2) Once FDD PCell change its timing with a reference configuration Q, it changes the timing of SCell CCs accordingly.

(3) Let's say TDD DL/UL configuration N ($0 \leq N \leq 6$) is used for CC2, and the reference configuration for CC2 was configuration L ($0 \leq L \leq 6$). Now, PCell reference configuration changes from FDD to TDD Q, CC2 changes its configuration from L to reference configuration of (Q, N).

(4) CC3 changes its timing to reference configuration of (Q, M) accordingly.

(5) When CC3 is deactivated, PCell changes its timing, then it shall notify the SCell updated timing to other SCells to update the reference timing accordingly.

Procedure similar to above (1) to (5) may be applied for downlink case such as scenario X of FIG. 8A.

Note that the techniques mentioned here are applicable to carrier aggregation over ideal backhaul scenarios if applicable. For example, TDD PCell and FDD SCell CA can use the new downlink 'PDSCH→HARQ-ACK/NACK' timing proposed in this application (i.e., SCell follows PCell timing and for the downlink subframes which do not have HARQ-ACK/NACK mapping per PCell timing can be mapped to k (k=10) such that HARQ-ACK/NACK signal of PDSCH transmitted at n-th subframe can be transmitted at n+k-th subframe).

Furthermore, techniques proposed for each scenario of FIGS. 8A to 8D can be applicable to different cases (but not limited to cases listed in this invention). Moreover, techniques for scenario Y of FIG. 8A can be applicable to scenario Z of FIG. 8C and techniques for scenario X of FIG. 8A can be applicable to scenario W of FIG. 8D.

Coordination protocols among eNBs would be necessary for any carrier aggregation over non-ideal backhaul scenarios.

FDD/TDD Carrier Aggregation Timing Determination

When TDD and FDD carriers are aggregated (e.g., CASE 2A and/or CASE 2B), overall, two cases can be considered as illustrated in FIG. 6A and FIG. 6B where FDD can be PCell or TDD can be PCell.

Focusing on the first case (CASE 2B) where PCell duplex mode is FDD and one or more SCell carriers use TDD duplex type, it is expected that PCell has more downlink and uplink subframes compared to SCell (TDD carrier) when DFF is PCell. Also, to support robust behavior of UE, it is desirable to utilize uplink subframes of PCell as much as possible.

In essence, it is natural to transmit HARQ-ACK/NACK for any downlink data transmission (PDSCH) following FDD timing (i.e., n+4th subframe transmitting HARQ-ACK/NACK for PDSCH transmitted at nth subframe).

However, this approach requires UE performing "FDD-like" operation even for TDD carrier in terms of determining timing for DL and/or UL transmission of TDD carrier.

Thus, the present invention proposes to configure a reference TDD DL/UL configuration for FDD PCell which will be used by TDD SCell carriers to determine DL and UL timing. It is also notable that a separate reference configuration can be given for DL and UL timing respectively such that two TDD DL/UL configurations (which can be identical or different) to PCell FDD which will be used for determining DL and UL timing of a SCell respectively.

An example is that PCell FDD and SCell TDD UL/DL configuration 1 is used, then UL/DL configuration 2 and configuration 0 can be given to PCell for determining DL and UL timing of SCell TDD carriers. SCell TDD will determine its DL and UL timing based on carrier combination with UL/DL configuration 1 and UL/DL configuration 2 for DL-timing and UL/DL configuration 1 and UL/DL configuration 0 for UL-timing.

The similar thing can be applied to SCell FDD when the SCell FDD performs scheduling for another SCell TDD carrier (i.e., FDD carrier becomes scheduling carrier for a TDD carrier). One TDD DL/UL configuration may be given to scheduling FDD carrier which will be used to determine DL-timing of SCell TDD carrier (cross-scheduled carrier) when cross-carrier scheduling is used.

More specifically, separate DL/UL configuration can be given per each channel. For example, PDSCH, PUCCH, PUSCH, PHICH may determine its timing based on UL/DL configuration of serving cell and a reference UL/DL configuration for PCell configured for the specific channel.

If a UE is not configured with any reference UL/DL configuration for FDD PCell even though it is configured with at least one TDD SCell, it may assume that the reference UL/DL configuration for FDD PCell is same as configuration for SCell carrier with lowest SCell index and its duplex type is TDD.

Once a reference DL/UL TDD configuration is given to PCell, a SCell CC which uses TDD duplex mode uses the reference DL/UL configuration to determine its timing for DL channels and UL channels. In terms of composing actual content or applying protocols, two approaches are feasible:

(i) Regardless of reference DL/UL configuration, follow the target carrier's duplex mode. For example, if PUCCH is transmitted via PCell which is FDD, HARQ-ACK/NACK composition and actual transmission may follow FDD protocol.

(ii) If DL/UL configuration is given to PCell FDD, follow TDD duplex mode as if PCell is TDD carrier in terms of creating HARQ-ACK/NACK or PHICH. This would be applicable only if a UE is configured with at least one or more TDD SCell carriers. In other words, when there is no SCell with TDD, reference configuration may be ignored.

Alternatively, to support fall-back and reliable operation, once reference configuration is given, UE may assume that TDD behavior (in terms of creating HARQ-ACK) is used.

Handling Half-Duplex TDD/TDD or TDD/FDD or FDD/FDD CA UE

Case of when Two CCs are Aggregated

When a UE is not able to perform simultaneous reception and transmission, an approach where scheduling may determine the direction at a given subframe can be used such that a UE follows eNB scheduling to determine the direction of either downlink or uplink at a subframe.

It is assumed that always scheduling based uplink or downlink has higher priority over other potential downlink and uplink transmissions. However, it is feasible that a downlink subframe (scheduled) and a scheduled uplink subframe may partially overlapped.

Figure 16:
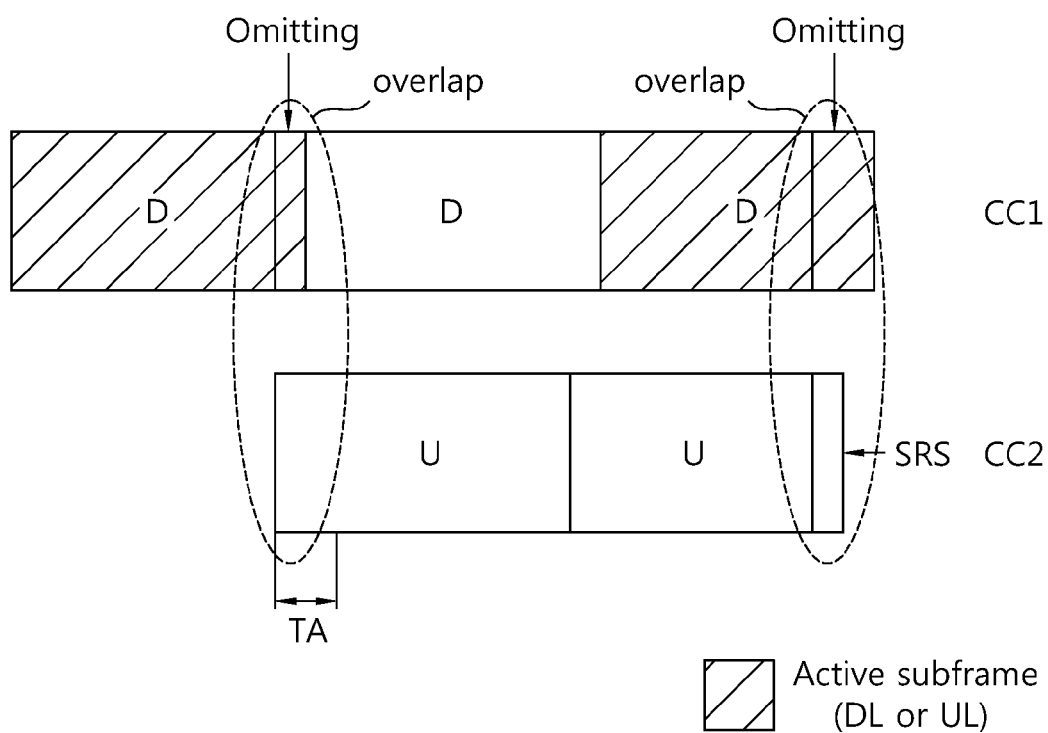
FIG. 16 briefly describes an example of partially overlapped downlink subframe and uplink subframe in half-duplex carrier aggregation.

FIG. 16 briefly describes an example of partially overlapped downlink subframe and uplink subframe in half-duplex carrier aggregation. Referring to FIG. 16, downlink subframe of CC 1 and uplink subframe of CC2 are partially overlapped as described.

In this case, a UE may assume that the last few OFDM symbol(s) of downlink may be skipped to support uplink transmission.

In terms of determining "scheduled" transmission either downlink or uplink, among potential transmissions, it needs to consider the followings as the scheduled transmission: PDSCH with DCI, PUSCH with uplink grant, aperiodic CSI response, and aperiodic SRS. It is also noted that resource allocated by device-to-device operation such as D2D grant or transmission resource pool by SIB can be considered for scheduled transmission. As for aperiodic SRS, downlink transmission and SRS transmission may be performed simultaneously if only SRS is transmitted for the uplink transmission by not listening or omitting a few last OFDM symbols similar to the example shown in above.

In terms of other potentially scheduled data, the following considerations may be made: (a) PUCCH, (b) SPS PDSCH/PUSCH, (c) periodic CSI, (d) cell-common data reception, (e) PHICH, and (f) periodic SRS.

PUCCH: in fact, this may not cause any issue if PUCCH is transmitted via PCell only. PUCCH may be transmitted following PCell PUCCH timing. However, when SCell PUCCH is supported, PUCCH needs to be assumed as "scheduled" uplink transmission. When PUCCH is transmitted to PCell, it is assumed as 'scheduled' as well.

In case, PCell UL and SCell DL collide in a subframe, SCell DL cannot be used when PUCCH is transmitted via PCell UL.

(b) SPS PDSCH/PUSCH: Considering SPS PDSCH is mainly used for VoIP scheduling, this is also assumed as "scheduled" transmission.

(c) periodic CSI: Periodic CSI will be reported only if there is no 'scheduled' downlink transmission.

If there is 'scheduled' downlink transmission, periodic CSI will be skipped. If aperiodic SRS is also scheduled in that subframe, periodic CSI is transmitted assuming that the subframe is scheduled as uplink subframe. Also, if PUSCH is scheduled, periodic CSI is transmitted.

In other words, only if periodic CSI report itself is not considered as 'scheduled' uplink.

However, if there is other 'scheduled' uplink transmission, periodic CSI can be piggybacked or transmitted.

(d) cell-common data reception: When a UE needs to read cell-common data such as SIB due to SIB change notification, TPC, RAR, etc, those will be considered as 'scheduled' transmission.

When 'scheduled' downlink and 'scheduled' uplink are collided, 'scheduled' downlink can be considered as higher priority transmission and thus UE will monitor downlink transmission. Or, it can be assumed otherwise by assuming that the network will avoid colliding scheduling and schedule the uplink only when the uplink transmission is important.

Thus, in this case, uplink transmission can take higher priority.

(e) PHICH: PHICH is not considered as scheduled as uplink (re)transmission can be triggered always by explicit uplink grant.

(f) periodic SRS: Unless there is uplink scheduled in the subframe where periodic SRS is configured, periodic SRS transmission is not considered as 'scheduled' transmission. However, if there is any scheduled uplink transmission, periodic SRS can be also transmitted if allowed (either by shortened PUCCH or shortened PUSCH). Furthermore, even without uplink scheduling, if a few OFDM symbols of downlink reception can be skipped, periodic SRS can be transmitted regardless of 'scheduled' uplink transmission or not.

When there is no 'scheduled' downlink or uplink, a UE will monitor downlink subframe. Other signals/channels not mentioned as 'scheduled' transmission such as MBMS, PRS can be considered as 'not-scheduled' transmission.

(2) Case of when More than Two CCs are Aggregated

Similar principle can be applicable for more than 2CC aggregation where scheduled transmission takes the highest priority and then downlink direction if there is no scheduled transmission.

Note that the concept mentioned here can be applicable to cases in HD FDD (regardless of CA case or not) or FDD-TDD CA or different TDD CA half-duplex operation where either DL/UL cannot be supported simultaneously or UL/DL cannot be simultaneously supported. More specifically, omitting a last few OFDM symbols from downlink to allow SRS transmission in uplink transmission can be applicable to half-duplex operation where uplink and downlink subframe overlap generally.

Figure 17:
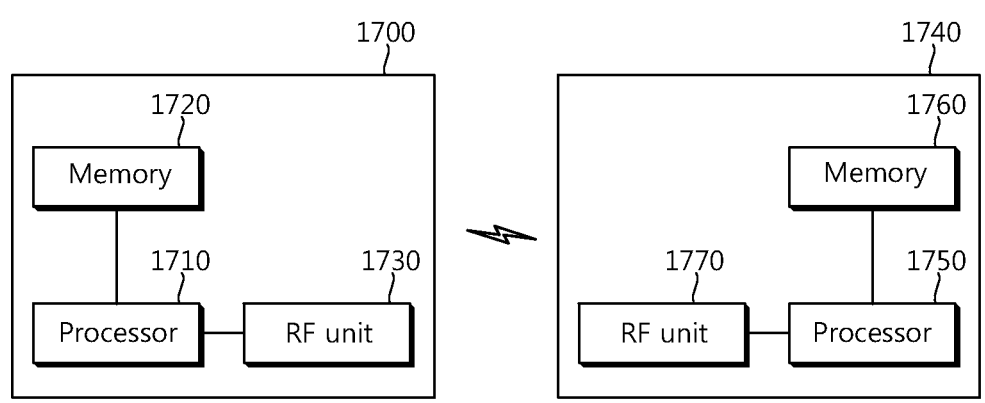
FIG. 17 is a block diagram which briefly describes a wireless communication system based on the present invention.

FIG. 17 is a block diagram which briefly describes a wireless communication system including an UE 1700 and a BS 1740. The UE 1700 and the BS 1740 may operate based on the description as explained above.

In view of downlink, a transmitter may be a part of the BS 1740 and a receiver may be a part of the UE 1700. In view of uplink, a transmitter may be a part of the UE 1700 and a receiver may be a part of the BS 1740.

Referring to FIG. 17, the UE 1700 may include a processor 1710, a memory 1720 and a radio frequency (RF) unit 1730.

The processor 1710 may be configured to implement proposed procedures and/or methods described in this application. For example, the processor 1710 may receive and/or transmit signal via RF unit 1730 based on scheduling. The scheduling is configured based on downlink (DL)/uplink (UL) transmission configured with a primary cell (PCell) with TDD and a secondary cell (SCell) of FDD or configured with a PCell with FDD and a SCell with TDD. The processor 1710 also may perform what needs under TDD/FDD aggregation. The details are same as described above.

The memory 1720 is coupled with the processor 1710 and stores a variety of information to operate the processor 1710, which includes data information and/or control information. The RF unit 1730 is also coupled with the processor 1710. The RF unit 1730 may transmit and/or receive a radio signal.

The BS 1740 may include a processor 1750, a memory 1760 and a RF unit 1770. Here, the BS may be PCell or SCell and the BS may be a macro cell or small cell.

The processor 1750 may be configured to implement proposed procedures and/or methods described in this application. For example, the processor 1750 may schedule UL/DL considering TDD/FDD aggregation. The processor 1750 may perform scheduling for uplink (UL) and/or downlink (DL) transmission configured with a primary cell (PCell) of TDD and a secondary cell (SCell) of FDD or a PCell of FDD and a SCell of TDD. Further, the processor 1750 may determine CA timing, perform or instruct transmission power control, handles half-duplex, etc. The details are same as described above.

The memory 1760 is coupled with the processor 1750 and stores a variety of information to operate the processor 1750, which includes data information and/or control information. The RF unit 1770 is also coupled with the processor 1750. The RF unit 1770 may transmit and/or receive a radio signal.

The UE 1700 and/or the BS 1740 may have single antenna or multiple antennas. The wireless communication system may be called as multiple input/multiple output (MIMO) system when at least one of the UE 1700 and the BS 1710 has multiple antennas.

Figure 18:
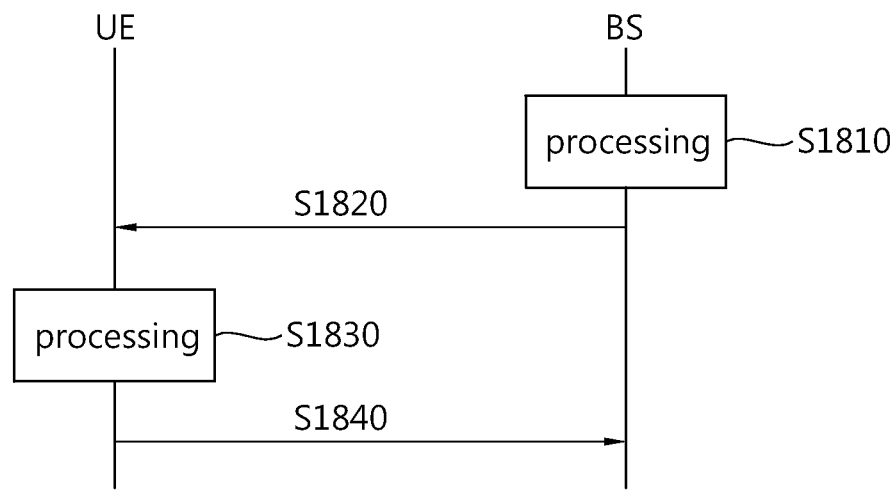
FIG. 18 is a flowchart which explains an operation of a UE and a BS based on the described uplink selection according to the present invention.

FIG. 18 is a flowchart which explains briefly an operation of a UE and a BS based on the described uplink selection according to the present invention.

Referring to FIG. 18, a BS may process what needed for operation in the wireless system at step of S1810. Here, the BS may be PCell or SCell and the BS may be a macro cell or small cell.

The wireless system may operate under TDD/FDD aggregation. For example, the BS may perform scheduling for uplink (UL) and/or downlink (DL) transmission configured with a primary cell (PCell) of TDD and a secondary cell (SCell) of FDD or a PCell of FDD and a SCell of TDD. The detailed behaviors of BS including scheduling, etc. are same as described above.

The BS may transmit downlink signal at step of S1820. The BS may transmit information configured at step of S1810 based on the SL/UL schedule. The control information may also be signaled by higher level signaling. A UE may also receive information from BS at step of S1820.

The UE may process what needed for operation in the wireless system at step of S1830. The UE may configure signal according to the information on the scheduling, UL/DL configuration, DCI format, etc. The scheduling is configured based on downlink (DL)/uplink (UL) transmission configured with a primary cell (PCell) with TDD and a secondary cell (SCell) of FDD or configured with a PCell with FDD and a SCell with TDD. The information from BS contains information on TDD/FDD aggregation or indication reflecting TDD/FDD aggregation. The details are same as described above.

The UE may transmit uplink signal according to the UL/DL scheduling at step of 1840.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

The invention claimed is:

1. A method for frequency division duplex (FDD)/time division duplex (TDD) aggregation by a user equipment (UE), the method comprising:
   receiving a downlink signal including scheduling information, wherein the scheduling information is based on a primary cell (PCell) having an FDD configuration and a secondary cell (SCell) having a TDD configuration for downlink (DL)/uplink (UL) transmission;
   receiving a reference TDD DL/UL configuration used for determining a specific UL subframe on the PCell having an FDD configuration, wherein the reference TDD DL/UL configuration indicates UL subframes and DL subframes on the SCell having a TDD configuration;
   determining the specific UL subframe on the PCell, which is aligned with an UL subframe on the SCell, based on the received reference TDD DL/UL configuration; and
   transmitting an uplink signal using only the determined specific UL subframe on the PCell,
   wherein the UE belongs to both the PCell and the SCell, and
   wherein the SCell interferes with the PCell.

2. The method of claim 1, wherein the scheduling information indicates that the UL transmission and the DL transmission are scheduled DCI format of the SCell.

3. The method of claim 1, wherein a TDD band and one of an FDD UL band or an FDD DL band are partially overlapped, and
   wherein the scheduling information indicates that transmission is not allowed in an overlapped region of the TDD band and one of the FDD UL band or the FDD DL band.

4. The method of claim 1, wherein receiving the downlink signal comprises receiving a reference for HARQ-ACK/NACK timing, and wherein transmitting the uplink signal comprises transmitting a HARQ-ACK/NACK signal based on the reference for HARQ-ACK/NACK timing.

5. The method of claim 1, wherein the downlink signal is received via one of at least two DL cells, and wherein a scheduled DL has higher priority than other DLs.

6. The method of claim 1, wherein the uplink signal is transmitted via one of at least two UL cells, and wherein a scheduled UL has higher priority than other ULs.

7. An apparatus for transmitting and receiving a radio signal based on frequency division duplex (FDD)/time division duplex (TDD) aggregation, the apparatus comprising:
   a radio frequency (RF) unit for transmitting and receiving a radio signal; and
   a processor, operatively coupled to the RF unit, that:
   controls the RF unit to receive a downlink signal including a scheduling information, wherein the scheduling information is based on a primary cell (PCell) having an FDD configuration and a secondary cell (SCell) having a TDD configuration for downlink (DL)/uplink (UL) transmission;
   controls the RF unit to receive a reference TDD DL/UL configuration used for determining a specific UL subframe on the PCell, wherein the reference TDD DL/UL configuration indicates UL subframes and DL subframes on the SCell;
   determines the specific UL subframe on the PCell, which is aligned with an UL subframe on the SCell, based on the received reference TDD DL/UL configuration; and
   controls the RF unit to transmit an uplink signal using only the determined specific UL subframe on the PCell,
   wherein the UE belongs to both the PCell and the SCell, and
   wherein the SCell with TDD interferes with the PCell with FDD.

8. The apparatus of claim 7, wherein the scheduling information indicates that the UL transmission and the DL transmission are scheduled according to a DCI format of the SCell.

9. The apparatus of claim 7, wherein a TDD band and one of an FDD UL band or an FDD DL band are partially overlapped, and wherein the scheduling information indicates that transmission is not allowed in an overlapped region of the TDD band and one of the FDD UL band or the FDD DL band.

10. The apparatus of claim 7, wherein the processor further controls the RF unit to:
   receive a reference for HARQ-ACK/NACK timing, and
   transmit a HARQ-ACK/NACK signal based on the reference for HARQ-ACK/NACK timing.

11. The apparatus of claim 7, wherein the processor further:
   controls the RF unit to receive the downlink signal via one of at least two DL cells, and
   grants higher priority to a scheduled DL than other DLs.

12. The apparatus of claim 7, wherein the processor further:
   controls the RF unit to transmit the uplink signal via one of at least two UL cells, and
   grants higher priority to a scheduled UL than other ULs.

13. The method of claim 1, wherein the uplink signal is transmitted by using at least one of PUCCH or PUSCH.

14. The apparatus of claim 7, wherein the uplink signal is transmitted by using at least one of PUCCH or PUSCH.

\* \* \* \* \*